(12) United States Patent
Mehtani et al.

(10) Patent No.: US 12,499,427 B2
(45) Date of Patent: Dec. 16, 2025

(54) DIRECT ELECTRONIC BILL PAYMENT WITH REAL-TIME FUNDS AVAILABILITY

(71) Applicant: Early Warning Services, LLC, Scottsdale, AZ (US)

(72) Inventors: Rohit Mehtani, San Francisco, CA (US); Suresh Munusamy, Scottsdale, AZ (US); Rajesh Kulkarni, Scottsdale, AZ (US); Charles Schaefer, Kentfield, CA (US); Bruce Rapport, Folsom, CA (US); Rich Rezek, Zionsville, IN (US); James Armistead, Mill Creek, CA (US)

(73) Assignee: EARLY WARNING SERVICES, LLC, Scottsdale, AZ (US)

( * ) Notice: Subject to any disclaimer, the term of this patent is extended or adjusted under 35 U.S.C. 154(b) by 0 days.

(21) Appl. No.: 17/900,092

(22) Filed: Aug. 31, 2022

(65) Prior Publication Data

US 2023/0066235 A1 Mar. 2, 2023

Related U.S. Application Data

(60) Provisional application No. 63/239,107, filed on Aug. 31, 2021.

(51) Int. Cl.
*G06Q 20/02* (2012.01)
*G06Q 20/10* (2012.01)
*G06Q 20/40* (2012.01)

(52) U.S. Cl.
CPC ......... *G06Q 20/102* (2013.01); *G06Q 20/023* (2013.01); *G06Q 20/4097* (2013.01)

(58) Field of Classification Search
CPC ............... G06Q 20/102; G06Q 20/023; G06Q 20/4097; G06Q 20/401; G06Q 20/4016
(Continued)

(56) References Cited

U.S. PATENT DOCUMENTS 2,011,032 A 8/1935 Blanchard
5,229,764 A 7/1993 Matchett et al.
(Continued)

FOREIGN PATENT DOCUMENTS

AU 4034997 3/1998
AU 1757201 5/2001
(Continued)

OTHER PUBLICATIONS

International Search Report for PCT/US2016/042163, dated Sep. 26, 2016.
(Continued)

*Primary Examiner* — Clifford B Madamba
(74) *Attorney, Agent, or Firm* — BRYAN CAVE LEIGHTON PAISNER LLP

(57) ABSTRACT

A method including receiving, at a payment-messaging system from a biller financial institution, a request comprising a public consumer token of a consumer. The consumer provided the public consumer token to a biller system of a biller for a bill payment by the consumer to the biller. The biller system provided the public consumer token to the biller financial institution. The biller financial institution maintains a biller account of the biller. The acts also can include determining a risk metric representing a risk of using the public consumer token for the bill payment. The acts additionally can include sending the risk metric from the payment-messaging system to the biller financial institution. The biller financial institution sends the risk metric to the biller system to allow the biller to determine whether to assume liability for the bill payment. The acts further can include receiving, at the payment-messaging system from the biller financial institution, an authorization message for the bill payment. The authorization message was provided to the biller financial institution by the biller system. The acts
(Continued)

additionally can include sending the authorization message for the bill payment to a consumer financial institution, to cause the consumer financial institution to send a real-time payment message through the payment-messaging system to the biller financial institution to make funds available in real-time in the biller account for the bill payment. Other embodiments are described.

20 Claims, 8 Drawing Sheets

(58) Field of Classification Search
USPC .......................................................... 705/40
See application file for complete search history.

(56) References Cited

U.S. PATENT DOCUMENTS

| | | |
|---|---|---|
| 5,265,007 A | 11/1993 | Barnhard, Jr. et al. |
| 5,282,249 A | 1/1994 | Cohen et al. |
| 5,283,829 A | 2/1994 | Anderson |
| 5,329,589 A | 7/1994 | Fraser et al. |
| 5,383,113 A | 1/1995 | Kight et al. |
| 5,453,601 A | 9/1995 | Rosen |
| 5,455,407 A | 10/1995 | Rosen |
| 5,465,206 A | 11/1995 | Hilt et al. |
| 5,481,609 A | 1/1996 | Cohen et al. |
| 5,619,657 A | 4/1997 | Sudama et al. |
| 5,642,419 A | 6/1997 | Rosen |
| 5,649,117 A | 7/1997 | Landry |
| 5,652,786 A | 7/1997 | Rogers |
| 5,671,280 A | 9/1997 | Rosen |
| 5,677,955 A | 10/1997 | Doggett et al. |
| 5,699,528 A | 12/1997 | Hogan |
| 5,703,344 A | 12/1997 | Bezy et al. |
| 5,729,594 A | 3/1998 | Klingman |
| 5,745,886 A | 4/1998 | Rosen |
| 5,781,723 A | 7/1998 | Yee et al. |
| 5,790,677 A | 8/1998 | Fox et al. |
| 5,826,241 A | 10/1998 | Stein et al. |
| 5,832,460 A | 11/1998 | Bednar et al. |
| 5,848,161 A | 12/1998 | Luneau et al. |
| 5,848,400 A | 12/1998 | Chang |
| 5,870,473 A | 2/1999 | Boesch et al. |
| 5,873,072 A | 2/1999 | Kight et al. |
| 5,878,141 A | 3/1999 | Daly et al. |
| 5,884,288 A | 3/1999 | Chang et al. |
| 5,889,863 A | 3/1999 | Weber |
| 5,899,980 A | 5/1999 | Wilf et al. |
| 5,903,721 A | 5/1999 | Sixtus |
| 5,913,203 A | 6/1999 | Wong et al. |
| 5,915,023 A | 6/1999 | Bernstein |
| 5,920,847 A | 7/1999 | Kolling et al. |
| 5,920,848 A | 7/1999 | Schutzer et al. |
| 5,946,669 A | 8/1999 | Polk |
| 5,956,700 A | 9/1999 | Landry |
| 5,970,475 A | 10/1999 | Barnes et al. |
| 5,978,840 A | 11/1999 | Nguyen et al. |
| 5,983,208 A | 11/1999 | Haller et al. |
| 5,987,132 A | 11/1999 | Rowney |
| 5,987,140 A | 11/1999 | Rowney et al. |
| 5,996,076 A | 11/1999 | Rowney et al. |
| 5,999,625 A | 12/1999 | Bellare et al. |
| 6,002,767 A | 12/1999 | Kramer |
| 6,016,484 A | 1/2000 | Williams et al. |
| 6,029,150 A | 2/2000 | Kravitz |
| 6,032,133 A | 2/2000 | Hilt et al. |
| 6,035,285 A | 3/2000 | Schlect et al. |
| 6,039,250 A | 3/2000 | Ito et al. |
| 6,044,362 A | 3/2000 | Neely |
| 6,049,786 A | 4/2000 | Smorodinsky |
| 6,058,380 A | 5/2000 | Anderson et al. |
| 6,061,665 A | 5/2000 | Bahreman |
| 6,070,150 A | 5/2000 | Remington et al. |
| 6,072,870 A | 6/2000 | Nguyen et al. |
| 6,078,907 A | 6/2000 | Lamm |
| 6,081,790 A | 6/2000 | Rosen |
| 6,085,168 A | 7/2000 | Mori et al. |
| 6,112,181 A | 8/2000 | Shear et al. |
| 6,119,101 A | 9/2000 | Peckover |
| 6,119,106 A | 9/2000 | Mersky et al. |
| 6,119,107 A | 9/2000 | Polk |
| 6,125,352 A | 9/2000 | Franklin et al. |
| 6,128,603 A | 10/2000 | Dent et al. |
| 6,138,107 A | 10/2000 | Elgamal |
| 6,145,738 A | 11/2000 | Stinson et al. |
| 6,167,378 A | 12/2000 | Webber, Jr. |
| 6,173,272 B1 | 1/2001 | Thomas et al. |
| 6,236,981 B1 | 5/2001 | Hill |
| 6,246,996 B1 | 6/2001 | Stein et al. |
| 6,260,024 B1 | 7/2001 | Shkedy |
| 6,285,991 B1 | 9/2001 | Powar |
| 6,289,322 B1 | 9/2001 | Kitchen et al. |
| 6,292,211 B1 | 9/2001 | Pena |
| 6,292,789 B1 | 9/2001 | Schutzer |
| 6,304,857 B1 | 10/2001 | Heindel et al. |
| 6,304,860 B1 | 10/2001 | Martin, Jr. et al. |
| 6,311,170 B1 | 10/2001 | Embrey |
| 6,317,745 B1 | 11/2001 | Thomas et al. |
| 6,334,116 B1 | 12/2001 | Ganesan et al. |
| 6,381,582 B1 | 4/2002 | Walker et al. |
| 6,385,595 B1 | 5/2002 | Kolling et al. |
| 6,411,942 B1 | 6/2002 | Fujimoto |
| 6,438,527 B1 | 8/2002 | Powar |
| 6,446,051 B1 | 9/2002 | Gupta |
| 6,488,203 B1 | 12/2002 | Stoutenburg et al. |
| 6,502,747 B1 | 1/2003 | Stoutenburg et al. |
| 6,578,015 B1 | 6/2003 | Haseltine et al. |
| 6,587,550 B2 | 7/2003 | Council et al. |
| 6,594,647 B1 | 7/2003 | Randle et al. |
| 6,609,114 B1 | 8/2003 | Gressel et al. |
| 6,647,376 B1 | 11/2003 | Farrar et al. |
| 6,678,664 B1 | 1/2004 | Ganesan |
| 6,839,687 B1 | 1/2005 | Dent et al. |
| 6,847,708 B1 | 1/2005 | Abbasi et al. |
| 6,868,391 B1 | 3/2005 | Hultgren |
| 6,882,986 B1 | 4/2005 | Heinemann et al. |
| 6,891,953 B1 | 5/2005 | DeMello et al. |
| 6,968,319 B1 | 11/2005 | Remington et al. |
| 6,996,542 B1 | 2/2006 | Landry |
| 7,003,480 B2 | 2/2006 | Fox et al. |
| 7,004,382 B2 | 2/2006 | Sandru |
| 7,010,512 B1 | 3/2006 | Gillin et al. |
| 7,031,939 B1 | 4/2006 | Gallagher et al. |
| 7,035,821 B1 | 4/2006 | Smith, II et al. |
| 7,039,951 B1 | 5/2006 | Chaudhari et al. |
| 7,051,001 B1 | 5/2006 | Slater |
| 7,089,208 B1 | 8/2006 | Levchin et al. |
| 7,098,783 B2 | 8/2006 | Crichlow |
| 7,103,261 B2 | 9/2006 | Grecia |
| 7,120,606 B1 | 10/2006 | Ranzini et al. |
| 7,120,608 B1 | 10/2006 | Gallagher et al. |
| 7,133,835 B1 | 11/2006 | Fusz et al. |
| 7,184,980 B2 | 2/2007 | Allen-Rouman et al. |
| 7,191,151 B1 | 3/2007 | Nosek |
| 7,200,551 B1 | 4/2007 | Senez |
| 7,206,938 B2 | 4/2007 | Bender et al. |
| 7,227,950 B2 | 6/2007 | Faith et al. |
| 7,240,031 B1 | 7/2007 | Kight et al. |
| 7,249,098 B2 | 7/2007 | Milberger et al. |
| 7,254,235 B2 | 8/2007 | Boudreault et al. |
| 7,287,009 B1 | 10/2007 | Liebermann |
| 7,296,004 B1 | 11/2007 | Garrison et al. |
| 7,302,411 B2 | 11/2007 | Ganesan et al. |
| 7,319,855 B1 | 1/2008 | Brune et al. |
| 7,321,874 B2 | 1/2008 | Dilip et al. |
| 7,321,875 B2 | 1/2008 | Dilip et al. |
| 7,333,953 B1 | 2/2008 | Banaugh et al. |
| 7,343,014 B2 | 3/2008 | Sovio et al. |
| 7,349,871 B2 | 3/2008 | Labrou et al. |
| 7,353,203 B1 | 4/2008 | Kriplani et al. |
| 7,366,695 B1 | 4/2008 | Allen-Rouman et al. |
| 7,370,014 B1 | 5/2008 | Vasavada et al. |
| 7,376,587 B1 | 5/2008 | Neofytides et al. |

(56) References Cited

U.S. PATENT DOCUMENTS

| | | | |
|---|---|---|---|
| 7,383,223 B1 | 6/2008 | Dilip et al. |
| 7,383,226 B2 | 6/2008 | Kight et al. |
| 7,389,917 B2 | 6/2008 | Abraham et al. |
| 7,392,223 B1 | 6/2008 | Ganesan et al. |
| 7,395,241 B1 | 7/2008 | Cook et al. |
| 7,398,252 B2 | 7/2008 | Neofytides et al. |
| 7,426,492 B1 | 9/2008 | Bishop et al. |
| 7,450,010 B1 | 11/2008 | Gravelle et al. |
| 7,451,114 B1 | 11/2008 | Matsuda et al. |
| 7,475,039 B2 | 1/2009 | Remington et al. |
| 7,475,808 B1 | 1/2009 | Bishop et al. |
| 7,478,066 B2 | 1/2009 | Remington et al. |
| 7,499,887 B2 | 3/2009 | Boyle et al. |
| 7,500,602 B2 | 3/2009 | Gray |
| 7,505,937 B2 | 3/2009 | Dilip et al. |
| 7,519,560 B2 | 4/2009 | Lam et al. |
| 7,526,650 B1 | 4/2009 | Wimmer |
| 7,532,122 B2 | 5/2009 | Aull et al. |
| 7,536,722 B1 | 5/2009 | Saltz et al. |
| 7,596,701 B2 | 9/2009 | Varghese et al. |
| 7,603,311 B1 | 10/2009 | Yadav-Ranjan |
| 7,606,734 B2 | 10/2009 | Baig et al. |
| 7,606,787 B2 | 10/2009 | Keown et al. |
| 7,610,245 B2 | 10/2009 | Dent et al. |
| 7,613,653 B2 | 11/2009 | Milberger et al. |
| 7,620,602 B2 | 11/2009 | Jakstadt et al. |
| 7,636,668 B1 | 12/2009 | Alves et al. |
| 7,644,037 B1 | 1/2010 | Ostrovsky |
| 7,653,591 B1 | 1/2010 | Dabney |
| 7,657,497 B2 | 2/2010 | Nandy |
| 7,677,438 B2 | 3/2010 | DeJean et al. |
| 7,685,067 B1 | 3/2010 | Britto et al. |
| 7,689,482 B2 | 3/2010 | Lam et al. |
| 7,693,791 B2 | 4/2010 | Hahn-Carlson et al. |
| 7,702,579 B2 | 4/2010 | Neely et al. |
| 7,707,082 B1 | 4/2010 | Lapstun et al. |
| 7,707,107 B2 | 4/2010 | Gebb et al. |
| 7,711,690 B1 | 5/2010 | Garrison et al. |
| 7,716,127 B2 | 5/2010 | Gebb et al. |
| 7,716,132 B1 | 5/2010 | Spies et al. |
| 7,720,754 B1 | 5/2010 | Gutierrez-Sheris |
| 7,720,756 B2 | 5/2010 | Kavounas |
| 7,734,543 B2 | 6/2010 | Braco |
| 7,752,130 B2 | 7/2010 | Byrd et al. |
| 7,756,785 B2 | 7/2010 | Gebb et al. |
| 7,756,786 B2 | 7/2010 | Trende et al. |
| 7,765,156 B2 | 7/2010 | Staniar et al. |
| 7,769,687 B2 | 8/2010 | Gebb et al. |
| 7,769,998 B2 | 8/2010 | Lynch et al. |
| 7,774,271 B1 | 8/2010 | Edwards et al. |
| 7,778,901 B2 | 8/2010 | Ganesan et al. |
| 7,783,567 B1 | 8/2010 | Kleiman et al. |
| 7,792,749 B2 | 9/2010 | Ganesan |
| 7,809,650 B2 | 10/2010 | Bruesewitz et al. |
| 7,840,520 B2 | 11/2010 | Nandy |
| 7,848,972 B1 | 12/2010 | Sharma |
| 7,856,384 B1 | 12/2010 | Kulasooriya et al. |
| 7,870,070 B2 | 1/2011 | Meier et al. |
| 7,873,573 B2 | 1/2011 | Realini |
| 7,877,325 B2 | 1/2011 | Bishop et al. |
| 7,885,869 B2 | 2/2011 | Uehara et al. |
| 7,899,744 B2 | 3/2011 | Bishop et al. |
| 7,904,385 B2 | 3/2011 | Bishop et al. |
| 7,908,214 B2 | 3/2011 | Bishop et al. |
| 7,925,585 B2 | 4/2011 | Bishop et al. |
| 7,937,312 B1 | 5/2011 | Woolston |
| 7,941,367 B2 | 5/2011 | Bishop et al. |
| 7,941,372 B2 | 5/2011 | Bishop et al. |
| 7,942,321 B2 | 5/2011 | Linton et al. |
| 7,945,491 B2 | 5/2011 | Sharma |
| 7,953,660 B2 | 5/2011 | Ganesan et al. |
| 7,958,030 B2 * | 6/2011 | Kemper | G06Q 20/102 705/40 |
| 7,958,049 B2 | 6/2011 | Jamison et al. |
| 7,962,406 B2 | 6/2011 | Bishop et al. |
| 7,962,407 B2 | 6/2011 | Bishop et al. |
| 7,962,408 B2 | 6/2011 | Bishop et al. |
| 7,970,706 B2 | 6/2011 | Keene |
| 7,979,348 B2 | 7/2011 | Thomas et al. |
| 7,979,349 B2 | 7/2011 | Bishop et al. |
| 7,996,307 B2 | 8/2011 | Bishop et al. |
| 7,996,310 B1 | 8/2011 | Edwards et al. |
| 8,001,612 B1 | 8/2011 | Wieder |
| 8,020,005 B2 | 9/2011 | Mani et al. |
| 8,041,606 B2 | 10/2011 | Mascavage, III et al. |
| 8,050,997 B1 | 11/2011 | Nosek et al. |
| 8,060,389 B2 | 11/2011 | Johnson |
| 8,069,113 B2 | 11/2011 | Elterich |
| 8,069,115 B2 | 11/2011 | Schoenberg et al. |
| 8,073,772 B2 | 12/2011 | Bishop et al. |
| 8,073,773 B2 | 12/2011 | Kozee et al. |
| 8,086,497 B1 | 12/2011 | Oakes, III |
| 8,103,584 B2 | 1/2012 | Bishop et al. |
| 8,103,585 B2 | 1/2012 | Bishop et al. |
| 8,109,435 B2 | 2/2012 | Mayo et al. |
| 8,112,354 B2 | 2/2012 | Lalwani et al. |
| 8,121,894 B2 | 2/2012 | Mason |
| 8,121,945 B2 | 2/2012 | Rackley et al. |
| 8,123,124 B2 | 2/2012 | Salazar et al. |
| 8,126,793 B2 | 2/2012 | Jones |
| 8,165,934 B2 | 4/2012 | Manista et al. |
| 8,165,958 B1 | 4/2012 | McLaughlin et al. |
| 8,170,055 B2 | 5/2012 | Fang et al. |
| 8,180,706 B2 | 5/2012 | Bishop et al. |
| 8,190,514 B2 | 5/2012 | Bishop et al. |
| 8,195,565 B2 | 6/2012 | Bishop et al. |
| 8,229,850 B2 | 7/2012 | Dilip et al. |
| 8,234,212 B2 | 7/2012 | Bishop et al. |
| 8,244,609 B2 | 8/2012 | Prakash et al. |
| 8,249,965 B2 | 8/2012 | Tumminaro |
| 8,249,983 B2 | 8/2012 | Dilip et al. |
| 8,255,278 B1 | 8/2012 | Young et al. |
| 8,255,327 B2 | 8/2012 | Kemper et al. |
| 8,255,336 B2 | 8/2012 | Dilip et al. |
| 8,266,028 B2 | 9/2012 | Bulman et al. |
| 8,266,065 B2 | 9/2012 | Dilip et al. |
| 8,275,704 B2 | 9/2012 | Bishop et al. |
| 8,290,835 B2 | 10/2012 | Homer et al. |
| 8,290,862 B2 | 10/2012 | Sheehan et al. |
| 8,290,863 B2 | 10/2012 | Sheehan et al. |
| 8,290,865 B2 * | 10/2012 | Lawrence | G06Q 20/14 705/40 |
| 8,310,346 B2 | 11/2012 | Burbridge et al. |
| 8,311,913 B2 | 11/2012 | Marchetti et al. |
| 8,311,914 B2 | 11/2012 | Marchetti et al. |
| 8,311,937 B2 | 11/2012 | Marchetti et al. |
| 8,311,942 B1 | 11/2012 | Mason |
| 8,321,341 B2 | 11/2012 | Nandy |
| 8,341,046 B2 | 12/2012 | Marchetti et al. |
| 8,342,407 B2 | 1/2013 | Williams et al. |
| 8,352,365 B1 | 1/2013 | Goldberg et al. |
| 8,370,639 B2 | 2/2013 | Azar et al. |
| 8,374,932 B2 | 2/2013 | Marchetti et al. |
| 8,380,177 B2 | 2/2013 | Laracey |
| 8,380,591 B1 | 2/2013 | Kazenas et al. |
| 8,380,622 B2 | 2/2013 | Bushman et al. |
| 8,401,939 B2 | 3/2013 | Lam et al. |
| 8,402,555 B2 | 3/2013 | Grecia |
| 8,407,124 B2 | 3/2013 | Uehara et al. |
| 8,407,141 B2 | 3/2013 | Mullen et al. |
| 8,417,628 B2 | 4/2013 | Poplawski et al. |
| 8,423,460 B2 | 4/2013 | Kay et al. |
| 8,433,629 B2 | 4/2013 | Murtaugh et al. |
| 8,458,086 B2 | 6/2013 | Bishop et al. |
| 8,458,774 B2 | 6/2013 | Ganesan |
| 8,467,766 B2 | 6/2013 | Rackley et al. |
| 8,484,104 B1 | 7/2013 | Hurlbutt et al. |
| 8,498,914 B2 | 7/2013 | Hazelhurst |
| 8,521,657 B2 | 8/2013 | Kuebert et al. |
| 8,527,413 B2 | 9/2013 | Heller |
| 8,532,021 B2 | 9/2013 | Tumminaro |
| 8,533,079 B2 | 9/2013 | Sharma |
| 8,533,860 B1 | 9/2013 | Grecia |
| 8,549,601 B2 | 10/2013 | Ganesan |

(56) References Cited

U.S. PATENT DOCUMENTS

| | | | |
|---|---|---|---|
| 8,560,417 | B2 | 10/2013 | Mullen et al. |
| 8,596,527 | B2 | 12/2013 | Bishop et al. |
| 8,606,640 | B2 | 12/2013 | Brody et al. |
| 8,615,457 | B2 | 12/2013 | Mullen et al. |
| 8,634,559 | B2 | 1/2014 | Brown et al. |
| 8,646,685 | B2 | 2/2014 | Bishop et al. |
| 8,666,865 | B2 | 3/2014 | Mullen et al. |
| 8,706,641 | B2 | 4/2014 | Bruesewitz et al. |
| 8,713,325 | B2 | 4/2014 | Ganesan |
| 8,719,905 | B2 | 5/2014 | Ganesan |
| 8,738,526 | B2 | 5/2014 | Nosek et al. |
| 8,745,699 | B2 | 6/2014 | Ganesan |
| 8,751,347 | B2 | 6/2014 | Mullen et al. |
| 8,751,381 | B2 | 6/2014 | Musser et al. |
| 8,768,838 | B1 | 7/2014 | Hoffman |
| 8,769,784 | B2 | 7/2014 | Ganesan et al. |
| 8,775,306 | B2 | 7/2014 | Nosek et al. |
| 8,788,389 | B1 | 7/2014 | Fernandes |
| 8,789,153 | B2 | 7/2014 | Ganesan |
| 8,794,509 | B2 | 8/2014 | Bishop et al. |
| 8,806,592 | B2 | 8/2014 | Ganesan |
| 8,814,039 | B2 | 8/2014 | Bishop et al. |
| 8,820,633 | B2 | 9/2014 | Bishop et al. |
| 8,887,247 | B2 | 11/2014 | Ganesan |
| 8,887,308 | B2 | 11/2014 | Grecia |
| 8,893,237 | B2 | 11/2014 | Ganesan |
| 8,938,787 | B2 | 1/2015 | Turgeman |
| 8,992,306 | B2 | 3/2015 | Iddings |
| 9,235,831 | B2 | 1/2016 | Rolf |
| 9,392,008 | B1 | 7/2016 | Michel et al. |
| D769,296 | S | 10/2016 | Grecia |
| 9,626,664 | B2 | 4/2017 | Bouey et al. |
| 9,633,348 | B2 | 4/2017 | Rolf |
| 9,691,056 | B2 | 6/2017 | Bouey et al. |
| 9,697,517 | B1 * | 7/2017 | Chambers ............... G06Q 20/22 |
| 9,704,152 | B1 | 7/2017 | Rolf |
| 9,928,490 | B1 | 3/2018 | Vancini et al. |
| 9,965,760 | B2 | 5/2018 | Leber |
| D826,955 | S | 8/2018 | Grecia |
| 10,049,349 | B1 | 8/2018 | Grassadonia et al. |
| 10,078,821 | B2 | 9/2018 | Bouey et al. |
| 10,318,936 | B2 | 6/2019 | Muthu et al. |
| D857,054 | S | 8/2019 | Grecia |
| D857,712 | S | 8/2019 | Grecia |
| 10,395,223 | B2 | 8/2019 | Muthu et al. |
| 10,395,247 | B2 | 8/2019 | Gilliam, III et al. |
| 10,410,217 | B1 | 9/2019 | Duke et al. |
| 10,438,175 | B2 | 10/2019 | Finch et al. |
| 10,607,217 | B2 * | 3/2020 | Anderson ............... G06Q 20/26 |
| 10,755,282 | B1 | 8/2020 | Duke et al. |
| 10,762,477 | B2 | 9/2020 | Finch et al. |
| 11,010,766 | B1 | 5/2021 | Duke et al. |
| 11,037,167 | B1 | 6/2021 | Duke et al. |
| 11,042,877 | B2 | 6/2021 | Wolfs et al. |
| 11,055,722 | B1 | 7/2021 | Duke et al. |
| 11,151,522 | B2 | 10/2021 | Bartrim et al. |
| 11,151,523 | B2 | 10/2021 | Bartrim et al. |
| 11,157,884 | B2 | 10/2021 | Bartrim et al. |
| 11,282,074 | B2 * | 3/2022 | Kassemi ............... G06Q 20/401 |
| 11,295,283 | B1 | 4/2022 | Hecht |
| 11,373,182 | B2 | 6/2022 | Gilliam, III et al. |
| 11,979,370 | B2 | 5/2024 | McDonald |
| 2002/0007320 | A1 | 1/2002 | Hogan et al. |
| 2002/0013768 | A1 | 1/2002 | Ganesan |
| 2002/0023054 | A1 | 2/2002 | Gillespie |
| 2002/0029193 | A1 | 3/2002 | Ranjan et al. |
| 2002/0046185 | A1 | 4/2002 | Villart et al. |
| 2002/0052852 | A1 | 5/2002 | Bozeman |
| 2002/0091635 | A1 | 7/2002 | Dilip et al. |
| 2002/0128932 | A1 | 9/2002 | Yung et al. |
| 2002/0143634 | A1 | 10/2002 | Kumar et al. |
| 2002/0178112 | A1 | 11/2002 | Goeller et al. |
| 2002/0194080 | A1 | 12/2002 | Lourie |
| 2002/0194119 | A1 | 12/2002 | Wright et al. |
| 2002/0194503 | A1 | 12/2002 | Faith et al. |
| 2003/0014316 | A1 | 1/2003 | Jaalinoja et al. |
| 2003/0078884 | A1 | 4/2003 | Bauman |
| 2003/0097331 | A1 | 5/2003 | Cohen |
| 2003/0115151 | A1 | 6/2003 | Wheeler et al. |
| 2003/0126094 | A1 | 7/2003 | Fisher et al. |
| 2003/0130919 | A1 | 7/2003 | Templeton et al. |
| 2003/0216996 | A1 | 11/2003 | Cummings et al. |
| 2003/0220875 | A1 | 11/2003 | Lam et al. |
| 2003/0220876 | A1 | 11/2003 | Burger et al. |
| 2003/0233317 | A1 | 12/2003 | Judd |
| 2003/0236728 | A1 | 12/2003 | Sunderji et al. |
| 2004/0030645 | A1 | 2/2004 | Monaghan |
| 2004/0034594 | A1 | 2/2004 | Thomas et al. |
| 2004/0089711 | A1 | 5/2004 | Sandru |
| 2004/0138955 | A1 | 7/2004 | Song et al. |
| 2004/0139014 | A1 | 7/2004 | Song et al. |
| 2004/0158522 | A1 | 8/2004 | Brown et al. |
| 2004/0167854 | A1 | 8/2004 | Knowles et al. |
| 2004/0193522 | A1 | 9/2004 | Binet et al. |
| 2004/0230489 | A1 | 11/2004 | Goldthwaite et al. |
| 2004/0259626 | A1 | 12/2004 | Akram et al. |
| 2005/0008148 | A1 | 1/2005 | Jacobson |
| 2005/0010523 | A1 | 1/2005 | Myklebust et al. |
| 2005/0010786 | A1 | 1/2005 | Michener et al. |
| 2005/0069135 | A1 | 3/2005 | Brickell |
| 2005/0071283 | A1 | 3/2005 | Randle et al. |
| 2005/0080716 | A1 | 4/2005 | Belyi et al. |
| 2005/0125347 | A1 | 6/2005 | Akialis et al. |
| 2005/0137948 | A1 | 6/2005 | Kissner et al. |
| 2005/0149455 | A1 | 7/2005 | Bruesewitz et al. |
| 2005/0187873 | A1 | 8/2005 | Labrou |
| 2005/0240527 | A1 | 10/2005 | Goldman |
| 2005/0246292 | A1 | 11/2005 | Sarcanin |
| 2005/0273842 | A1 | 12/2005 | Wright et al. |
| 2005/0274793 | A1 | 12/2005 | Cantini et al. |
| 2005/0289030 | A1 | 12/2005 | Smith |
| 2005/0289061 | A1 | 12/2005 | Kulakowski |
| 2006/0000892 | A1 | 1/2006 | Bonalle |
| 2006/0006226 | A1 | 1/2006 | Fitzgerald et al. |
| 2006/0014532 | A1 | 1/2006 | Seligmann |
| 2006/0022048 | A1 | 2/2006 | Johnson |
| 2006/0080243 | A1 | 4/2006 | Kemper et al. |
| 2006/0080727 | A1 | 4/2006 | Hammons et al. |
| 2006/0085314 | A1 | 4/2006 | Grim, III et al. |
| 2006/0085357 | A1 | 4/2006 | Pizarro |
| 2006/0106717 | A1 | 5/2006 | Randle et al. |
| 2006/0116949 | A1 | 6/2006 | Wehunt et al. |
| 2006/0116960 | A1 | 6/2006 | Gillin et al. |
| 2006/0149632 | A1 | 7/2006 | Bhatti et al. |
| 2006/0149635 | A1 | 7/2006 | Bhatti et al. |
| 2006/0161772 | A1 | 7/2006 | Talstra et al. |
| 2006/0165060 | A1 | 7/2006 | Dua |
| 2006/0224470 | A1 | 10/2006 | Ruano et al. |
| 2006/0229960 | A1 | 10/2006 | Edelson |
| 2006/0280339 | A1 | 12/2006 | Cho |
| 2006/0282381 | A1 | 12/2006 | Ritchie |
| 2006/0287004 | A1 | 12/2006 | Fuqua |
| 2006/0287963 | A1 | 12/2006 | Steeves et al. |
| 2007/0012757 | A1 | 1/2007 | Mayo et al. |
| 2007/0046456 | A1 | 3/2007 | Edwards et al. |
| 2007/0061590 | A1 | 3/2007 | Boye et al. |
| 2007/0106892 | A1 | 5/2007 | Engberg |
| 2007/0108269 | A1 | 5/2007 | Benco et al. |
| 2007/0136167 | A1 | 6/2007 | Dilip et al. |
| 2007/0136168 | A1 | 6/2007 | Dilip et al. |
| 2007/0136169 | A1 | 6/2007 | Dilip et al. |
| 2007/0168281 | A1 | 7/2007 | Bishop et al. |
| 2007/0174189 | A1 | 7/2007 | Bishop et al. |
| 2007/0179885 | A1 | 8/2007 | Bird et al. |
| 2007/0198264 | A1 | 8/2007 | Chang |
| 2007/0198405 | A1 | 8/2007 | Bishop et al. |
| 2007/0198406 | A1 | 8/2007 | Bishop et al. |
| 2007/0203821 | A1 | 8/2007 | DuFour |
| 2007/0230371 | A1 | 10/2007 | Tumminaro |
| 2007/0233615 | A1 | 10/2007 | Tumminaro |
| 2007/0236330 | A1 | 10/2007 | Cho et al. |
| 2007/0244811 | A1 | 10/2007 | Tumminaro |
| 2007/0255620 | A1 | 11/2007 | Tumminaro et al. |
| 2007/0255652 | A1 | 11/2007 | Tumminaro et al. |

(56) References Cited

U.S. PATENT DOCUMENTS

| | | |
|---|---|---|
| 2007/0255653 A1 | 11/2007 | Tumminaro et al. |
| 2007/0255662 A1 | 11/2007 | Tumminaro |
| 2008/0011825 A1 | 1/2008 | Giordano et al. |
| 2008/0015982 A1 | 1/2008 | Sokolic et al. |
| 2008/0015985 A1 | 1/2008 | Abhari et al. |
| 2008/0015994 A1 | 1/2008 | Bonalle et al. |
| 2008/0032741 A1 | 2/2008 | Tumminaro |
| 2008/0033880 A1 | 2/2008 | Fiebiger et al. |
| 2008/0040171 A1 | 2/2008 | Albers |
| 2008/0046362 A1 | 2/2008 | Easterly |
| 2008/0082454 A1 | 4/2008 | Dilip et al. |
| 2008/0082828 A1 | 4/2008 | Jennings et al. |
| 2008/0086403 A1 | 4/2008 | Dilip et al. |
| 2008/0086426 A1 | 4/2008 | Dilip et al. |
| 2008/0091596 A1 | 4/2008 | Labaton |
| 2008/0097873 A1 | 4/2008 | Cohen et al. |
| 2008/0097899 A1 | 4/2008 | Jackson et al. |
| 2008/0109392 A1 | 5/2008 | Nandy |
| 2008/0120129 A1 | 5/2008 | Seubert et al. |
| 2008/0127319 A1 | 5/2008 | Galloway et al. |
| 2008/0140564 A1 | 6/2008 | Tal et al. |
| 2008/0141033 A1 | 6/2008 | Ginter et al. |
| 2008/0147536 A1 | 6/2008 | Breen |
| 2008/0167962 A1 | 7/2008 | Lawe |
| 2008/0177661 A1 | 7/2008 | Mehra |
| 2008/0189209 A1 | 8/2008 | Loomis et al. |
| 2008/0208737 A1 | 8/2008 | Dilip et al. |
| 2008/0208742 A1 | 8/2008 | Arthur et al. |
| 2008/0208743 A1 | 8/2008 | Arthur et al. |
| 2008/0210751 A1 | 9/2008 | Kim |
| 2008/0210752 A1 | 9/2008 | March |
| 2008/0222048 A1 | 9/2008 | Higgins et al. |
| 2008/0227471 A1 | 9/2008 | Dankar et al. |
| 2008/0238610 A1 | 10/2008 | Rosenberg |
| 2008/0242274 A1 | 10/2008 | Swanburg et al. |
| 2008/0244271 A1 | 10/2008 | Yu |
| 2008/0244277 A1 | 10/2008 | Orsini et al. |
| 2008/0249936 A1 | 10/2008 | Miller et al. |
| 2008/0249937 A1 | 10/2008 | Walls |
| 2008/0255993 A1 | 10/2008 | Blinbaum |
| 2008/0294563 A1 | 11/2008 | Boutahar et al. |
| 2008/0306872 A1 | 12/2008 | Felsher |
| 2008/0319887 A1 | 12/2008 | Pizzi et al. |
| 2009/0006861 A1 | 1/2009 | Bemmel |
| 2009/0006920 A1 | 1/2009 | Munson et al. |
| 2009/0030843 A1 | 1/2009 | Hoffman et al. |
| 2009/0043705 A1 | 2/2009 | Bishop et al. |
| 2009/0048885 A1 | 2/2009 | Bishop et al. |
| 2009/0048886 A1 | 2/2009 | Bishop et al. |
| 2009/0048887 A1 | 2/2009 | Bishop et al. |
| 2009/0048951 A1 | 2/2009 | Bishop et al. |
| 2009/0048952 A1 | 2/2009 | Bishop et al. |
| 2009/0048963 A1 | 2/2009 | Bishop et al. |
| 2009/0048966 A1 | 2/2009 | Bishop et al. |
| 2009/0048968 A1 | 2/2009 | Bishop et al. |
| 2009/0048969 A1 | 2/2009 | Bishop et al. |
| 2009/0048971 A1 | 2/2009 | Hathaway et al. |
| 2009/0068982 A1 | 3/2009 | Chen et al. |
| 2009/0070272 A1 | 3/2009 | Jain |
| 2009/0076956 A1 | 3/2009 | Bishop et al. |
| 2009/0076957 A1 | 3/2009 | Bishop et al. |
| 2009/0076958 A1 | 3/2009 | Bishop et al. |
| 2009/0083181 A1 | 3/2009 | Bishop et al. |
| 2009/0089193 A1 | 4/2009 | Paintin |
| 2009/0089205 A1 | 4/2009 | Bayne |
| 2009/0089209 A1 | 4/2009 | Bixler et al. |
| 2009/0099961 A1 | 4/2009 | Ogilvy |
| 2009/0112658 A1 | 4/2009 | Mullen et al. |
| 2009/0112659 A1 | 4/2009 | Mullen et al. |
| 2009/0112660 A1 | 4/2009 | Mullen et al. |
| 2009/0112661 A1 | 4/2009 | Mullen et al. |
| 2009/0112662 A1 | 4/2009 | Mullen et al. |
| 2009/0112747 A1 | 4/2009 | Mullen et al. |
| 2009/0119190 A1 | 5/2009 | Realini |
| 2009/0119212 A1 | 5/2009 | Liu et al. |
| 2009/0125323 A1 | 5/2009 | Lakshmanan et al. |
| 2009/0125426 A1 | 5/2009 | Bishop et al. |
| 2009/0125446 A1 | 5/2009 | Saunders et al. |
| 2009/0132392 A1 | 5/2009 | Davis et al. |
| 2009/0132423 A1 | 5/2009 | Liu |
| 2009/0138388 A1 | 5/2009 | Bishop et al. |
| 2009/0150269 A1 | 6/2009 | Bishop et al. |
| 2009/0150270 A1 | 6/2009 | Bishop et al. |
| 2009/0150271 A1 | 6/2009 | Bishop et al. |
| 2009/0150288 A1 | 6/2009 | Bishop et al. |
| 2009/0157518 A1 | 6/2009 | Bishop et al. |
| 2009/0157519 A1 | 6/2009 | Bishop et al. |
| 2009/0164324 A1 | 6/2009 | Bishop et al. |
| 2009/0164325 A1 | 6/2009 | Bishop et al. |
| 2009/0164326 A1 | 6/2009 | Bishop et al. |
| 2009/0164327 A1 | 6/2009 | Bishop et al. |
| 2009/0164328 A1 | 6/2009 | Bishop et al. |
| 2009/0164329 A1 | 6/2009 | Bishop et al. |
| 2009/0164330 A1 | 6/2009 | Bishop et al. |
| 2009/0164331 A1 | 6/2009 | Bishop et al. |
| 2009/0192873 A1 | 7/2009 | Marble |
| 2009/0204457 A1 | 8/2009 | Buhrmann et al. |
| 2009/0204815 A1 | 8/2009 | Dennis et al. |
| 2009/0228365 A1 | 9/2009 | Tomchek et al. |
| 2009/0265241 A1 | 10/2009 | Bishop et al. |
| 2009/0265249 A1 | 10/2009 | Bishop et al. |
| 2009/0265250 A1 | 10/2009 | Bishop et al. |
| 2009/0265252 A1 | 10/2009 | Fletcher |
| 2009/0271277 A1 | 10/2009 | Bishop et al. |
| 2009/0271278 A1 | 10/2009 | Bishop et al. |
| 2009/0271303 A1 | 10/2009 | Wang et al. |
| 2009/0282259 A1 | 11/2009 | Skorik et al. |
| 2009/0287564 A1 | 11/2009 | Bishop et al. |
| 2009/0287565 A1 | 11/2009 | Bishop et al. |
| 2009/0287601 A1 | 11/2009 | Tumminaro et al. |
| 2009/0289106 A1 | 11/2009 | Bishop et al. |
| 2009/0299841 A1 | 12/2009 | Bishop et al. |
| 2009/0307072 A1 | 12/2009 | Morales-Lema |
| 2009/0319425 A1 | 12/2009 | Tumminaro et al. |
| 2009/0327133 A1 | 12/2009 | Aharoni et al. |
| 2010/0030687 A1 | 2/2010 | Panthaki et al. |
| 2010/0031022 A1 | 2/2010 | Kramer |
| 2010/0042537 A1 | 2/2010 | Smith et al. |
| 2010/0042539 A1 | 2/2010 | Dheer et al. |
| 2010/0057622 A1 | 3/2010 | Faith et al. |
| 2010/0063935 A1 | 3/2010 | Thomas et al. |
| 2010/0070405 A1* | 3/2010 | Joa .................... G06Q 20/20 705/40 |
| 2010/0094765 A1 | 4/2010 | Nandy |
| 2010/0100480 A1 | 4/2010 | Altman et al. |
| 2010/0115610 A1 | 5/2010 | Tredoux et al. |
| 2010/0127822 A1 | 5/2010 | Devadas |
| 2010/0131415 A1 | 5/2010 | Sartipi |
| 2010/0138243 A1 | 6/2010 | Carroll |
| 2010/0161736 A1 | 6/2010 | Picknelly |
| 2010/0198645 A1 | 8/2010 | Heiss et al. |
| 2010/0198729 A1 | 8/2010 | Kavounas |
| 2010/0235280 A1 | 9/2010 | Boyd et al. |
| 2010/0250436 A1 | 9/2010 | Loevenguth et al. |
| 2010/0269166 A1 | 10/2010 | Awad et al. |
| 2010/0274678 A1 | 10/2010 | Rolf et al. |
| 2010/0274729 A1 | 10/2010 | Holm et al. |
| 2010/0293090 A1 | 11/2010 | Domenikos et al. |
| 2010/0306107 A1 | 12/2010 | Nahari |
| 2010/0320266 A1 | 12/2010 | White |
| 2011/0055078 A1 | 3/2011 | Nandy |
| 2011/0055083 A1 | 3/2011 | Grinhute |
| 2011/0066523 A1 | 3/2011 | Harrison |
| 2011/0066551 A1 | 3/2011 | Bruesewitz et al. |
| 2011/0078078 A1 | 3/2011 | Meier et al. |
| 2011/0110508 A1 | 5/2011 | LaFreniere et al. |
| 2011/0112945 A1 | 5/2011 | Cullen, III et al. |
| 2011/0112954 A1 | 5/2011 | Bruesewitz et al. |
| 2011/0131130 A1 | 6/2011 | Griffin et al. |
| 2011/0145149 A1 | 6/2011 | Valdes et al. |
| 2011/0161233 A1 | 6/2011 | Tieken |
| 2011/0173116 A1 | 7/2011 | Yan et al. |
| 2011/0173122 A1 | 7/2011 | Singhal |
| 2011/0184868 A1 | 7/2011 | Lacerte et al. |

(56) References Cited

U.S. PATENT DOCUMENTS

| | | |
|---|---|---|
| 2011/0191160 A1 | 8/2011 | Blackhurst et al. |
| 2011/0196782 A1 | 8/2011 | Allen et al. |
| 2011/0202407 A1 | 8/2011 | Buhrmann et al. |
| 2011/0202415 A1 | 8/2011 | Casares |
| 2011/0202982 A1 | 8/2011 | Alexander et al. |
| 2011/0247058 A1 | 10/2011 | Kisters |
| 2011/0251869 A1 | 10/2011 | Shekhter |
| 2011/0251952 A1 | 10/2011 | Kelly et al. |
| 2011/0258111 A1 | 10/2011 | Raj et al. |
| 2011/0264543 A1 | 10/2011 | Taveau et al. |
| 2011/0264583 A1 | 10/2011 | Cooper et al. |
| 2011/0270749 A1 | 11/2011 | Bennett et al. |
| 2011/0270756 A1 | 11/2011 | Tulllis et al. |
| 2011/0276473 A1 | 11/2011 | Blok |
| 2011/0276479 A1 | 11/2011 | Thomas |
| 2011/0282778 A1 | 11/2011 | Wright et al. |
| 2011/0295746 A1 | 12/2011 | Thomas et al. |
| 2011/0313921 A1 | 12/2011 | Dheer et al. |
| 2011/0320347 A1 | 12/2011 | Tumminaro et al. |
| 2012/0005749 A1 | 1/2012 | Poldi et al. |
| 2012/0016731 A1 | 1/2012 | Smith et al. |
| 2012/0018511 A1 | 1/2012 | Hammad |
| 2012/0041876 A1 | 2/2012 | Nosek et al. |
| 2012/0066121 A1 | 3/2012 | Shahbazi et al. |
| 2012/0084201 A1 | 4/2012 | Ostrovsky |
| 2012/0095912 A1 | 4/2012 | James et al. |
| 2012/0109802 A1 | 5/2012 | Griffin et al. |
| 2012/0116953 A1 | 5/2012 | Klein et al. |
| 2012/0130898 A1 | 5/2012 | Snyder et al. |
| 2012/0173409 A1 | 7/2012 | Hu |
| 2012/0173417 A1 | 7/2012 | Lohman et al. |
| 2012/0173610 A1 | 7/2012 | Bleau et al. |
| 2012/0203695 A1 | 8/2012 | Morgan et al. |
| 2012/0203700 A1* | 8/2012 | Ornce ............... G06Q 20/385 705/67 |
| 2012/0209766 A1 | 8/2012 | Kitchen et al. |
| 2012/0215688 A1 | 8/2012 | Musser |
| 2012/0231814 A1 | 9/2012 | Calman et al. |
| 2012/0260322 A1 | 10/2012 | Logan |
| 2012/0265687 A1 | 10/2012 | Dilip et al. |
| 2012/0278239 A1 | 11/2012 | Nosek et al. |
| 2012/0284154 A1 | 11/2012 | Creighton et al. |
| 2012/0284175 A1 | 11/2012 | Wilson et al. |
| 2012/0290453 A1 | 11/2012 | Manista et al. |
| 2013/0018791 A1 | 1/2013 | Mendocino et al. |
| 2013/0018793 A1 | 1/2013 | Wong et al. |
| 2013/0024360 A1 | 1/2013 | Ballout |
| 2013/0036000 A1 | 2/2013 | Giordano et al. |
| 2013/0036048 A1 | 2/2013 | Campos et al. |
| 2013/0054452 A1 | 2/2013 | Au et al. |
| 2013/0060708 A1 | 3/2013 | Oskolkov et al. |
| 2013/0073455 A1 | 3/2013 | McLaughlin et al. |
| 2013/0073462 A1 | 3/2013 | Zanzot et al. |
| 2013/0080333 A1 | 3/2013 | Kamotskyy et al. |
| 2013/0080368 A1 | 3/2013 | Nandy |
| 2013/0085936 A1 | 4/2013 | Law et al. |
| 2013/0097078 A1 | 4/2013 | Wong et al. |
| 2013/0103576 A1 | 4/2013 | Ackley |
| 2013/0110658 A1 | 5/2013 | Lyman et al. |
| 2013/0110678 A1 | 5/2013 | Vigier et al. |
| 2013/0110724 A1 | 5/2013 | Edwards |
| 2013/0117178 A1 | 5/2013 | Mullen et al. |
| 2013/0124364 A1 | 5/2013 | Mittal |
| 2013/0124405 A1 | 5/2013 | Hamzeh |
| 2013/0124406 A1 | 5/2013 | Poplawski et al. |
| 2013/0138557 A1 | 5/2013 | Mullen et al. |
| 2013/0151384 A1 | 6/2013 | Mullen et al. |
| 2013/0159070 A1 | 6/2013 | Salamone |
| 2013/0179281 A1 | 7/2013 | White et al. |
| 2013/0179352 A1 | 7/2013 | Dwyre et al. |
| 2013/0185214 A1 | 7/2013 | Azen et al. |
| 2013/0197998 A1 | 8/2013 | Buhrmann et al. |
| 2013/0212010 A1 | 8/2013 | Mullen et al. |
| 2013/0226627 A1 | 8/2013 | Kubovcik et al. |
| 2013/0226801 A1 | 8/2013 | Lyons et al. |
| 2013/0232071 A1 | 9/2013 | Dilip et al. |
| 2013/0232075 A1 | 9/2013 | Monaghan et al. |
| 2013/0238488 A1 | 9/2013 | Bouey et al. |
| 2013/0238489 A1 | 9/2013 | Bouey et al. |
| 2013/0238490 A1 | 9/2013 | Bouey et al. |
| 2013/0238491 A1 | 9/2013 | Bouey et al. |
| 2013/0238492 A1 | 9/2013 | Muthu et al. |
| 2013/0246280 A1 | 9/2013 | Kirsch |
| 2013/0262296 A1 | 10/2013 | Thomas et al. |
| 2013/0262311 A1 | 10/2013 | Buhrmann et al. |
| 2013/0268839 A1 | 10/2013 | Lefebvre et al. |
| 2013/0282588 A1 | 10/2013 | Hruska |
| 2013/0293363 A1 | 11/2013 | Plymouth et al. |
| 2013/0297501 A1 | 11/2013 | Monk et al. |
| 2014/0006184 A1 | 1/2014 | Godsey |
| 2014/0006281 A1 | 1/2014 | Leber |
| 2014/0032417 A1 | 1/2014 | Mattsson |
| 2014/0040069 A1 | 2/2014 | Tomasofsky et al. |
| 2014/0046820 A1 | 2/2014 | Sunderji et al. |
| 2014/0058862 A1 | 2/2014 | Celkonas |
| 2014/0059693 A1 | 2/2014 | Stecher |
| 2014/0067677 A1 | 3/2014 | Ali et al. |
| 2014/0070001 A1 | 3/2014 | Sanchez et al. |
| 2014/0074724 A1 | 3/2014 | Gordon et al. |
| 2014/0081783 A1 | 3/2014 | Paranjape et al. |
| 2014/0114838 A1 | 4/2014 | Nunes et al. |
| 2014/0143146 A1* | 5/2014 | Passanha ............ G06Q 20/385 705/44 |
| 2014/0164246 A1 | 6/2014 | Thomas et al. |
| 2014/0164541 A1 | 6/2014 | Marcellino |
| 2014/0187205 A1 | 7/2014 | Dankar et al. |
| 2014/0188586 A1 | 7/2014 | Carpenter et al. |
| 2014/0188697 A1 | 7/2014 | Bruesewitz et al. |
| 2014/0188728 A1 | 7/2014 | Dheer et al. |
| 2014/0195425 A1 | 7/2014 | Campos et al. |
| 2014/0244493 A1 | 8/2014 | Kenyon et al. |
| 2014/0244515 A1 | 8/2014 | Garfinkle et al. |
| 2014/0310142 A1 | 10/2014 | Mak |
| 2014/0337230 A1 | 11/2014 | Bacastow |
| 2014/0351137 A1 | 11/2014 | Chisholm |
| 2014/0365350 A1 | 12/2014 | Shvarts |
| 2014/0372308 A1 | 12/2014 | Sheets |
| 2015/0026061 A1 | 1/2015 | Siegel et al. |
| 2015/0039498 A1 | 2/2015 | Weiss |
| 2015/0046181 A1 | 2/2015 | Adjaoute |
| 2015/0046216 A1 | 2/2015 | Adjaoute |
| 2015/0046224 A1 | 2/2015 | Adjaoute |
| 2015/0066738 A1 | 3/2015 | Tian et al. |
| 2015/0066765 A1 | 3/2015 | Banks et al. |
| 2015/0067062 A1 | 3/2015 | Bleau et al. |
| 2015/0073975 A1 | 3/2015 | Bornhofen et al. |
| 2015/0073977 A1 | 3/2015 | Ghosh et al. |
| 2015/0081324 A1 | 3/2015 | Adjaoute |
| 2015/0089568 A1 | 3/2015 | Sprague et al. |
| 2015/0112866 A1 | 4/2015 | Muthu et al. |
| 2015/0150110 A1 | 5/2015 | Canning |
| 2015/0186994 A1 | 7/2015 | He |
| 2015/0193776 A1 | 7/2015 | Douglas et al. |
| 2015/0242823 A1 | 8/2015 | Dheer et al. |
| 2015/0278773 A1 | 10/2015 | Rolf et al. |
| 2015/0332273 A1 | 11/2015 | Bruno |
| 2015/0348030 A1 | 12/2015 | Cauwenberghs et al. |
| 2015/0363783 A1 | 12/2015 | Ronca |
| 2016/0034932 A1 | 2/2016 | Sion et al. |
| 2016/0078443 A1 | 3/2016 | Tomasofsky et al. |
| 2016/0078444 A1 | 3/2016 | Tomasofsky et al. |
| 2016/0092872 A1 | 3/2016 | Prakash et al. |
| 2016/0104133 A1 | 4/2016 | Davis et al. |
| 2016/0140538 A1 | 5/2016 | Einhorn |
| 2016/0188317 A1 | 6/2016 | Hilliar et al. |
| 2016/0203490 A1 | 7/2016 | Gupta et al. |
| 2016/0253663 A1 | 9/2016 | Clark et al. |
| 2016/0267280 A1 | 9/2016 | Mansour et al. |
| 2016/0283918 A1 | 9/2016 | Weinflash |
| 2016/0300206 A1 | 10/2016 | Novac et al. |
| 2016/0300207 A1 | 10/2016 | Novac et al. |
| 2016/0300225 A1 | 10/2016 | Novac et al. |
| 2016/0300226 A1 | 10/2016 | Novac et al. |
| 2016/0321625 A1 | 11/2016 | Gilliam, III et al. |

(56) References Cited

U.S. PATENT DOCUMENTS

| | | |
|---|---|---|
| 2016/0343043 A1 | 11/2016 | Hicks et al. |
| 2016/0358140 A1 | 12/2016 | Pigg et al. |
| 2017/0024719 A1 | 1/2017 | Finch et al. |
| 2017/0024744 A1 | 1/2017 | Finch et al. |
| 2017/0024828 A1 | 1/2017 | Michel et al. |
| 2017/0039534 A1 | 2/2017 | Smythe |
| 2017/0103399 A1 | 4/2017 | Napsky et al. |
| 2017/0140374 A1 | 5/2017 | O'Brien |
| 2017/0200143 A1 | 7/2017 | Rolf |
| 2017/0200155 A1 | 7/2017 | Fourez et al. |
| 2017/0221056 A1 | 8/2017 | Karpenko et al. |
| 2017/0221066 A1 | 8/2017 | Ledford et al. |
| 2017/0308887 A1 | 10/2017 | Rolf |
| 2017/0344960 A1 | 11/2017 | Garlick et al. |
| 2017/0344964 A1 | 11/2017 | Garlick et al. |
| 2017/0344983 A1 | 11/2017 | Muftic |
| 2018/0039990 A1 | 2/2018 | Lindemann |
| 2018/0041503 A1 | 2/2018 | Lindemann |
| 2018/0046994 A1 | 2/2018 | Maenpaa et al. |
| 2018/0181962 A1 | 6/2018 | Barnhardt et al. |
| 2018/0191501 A1 | 7/2018 | Lindemann |
| 2018/0191695 A1 | 7/2018 | Lindemann |
| 2019/0012647 A1 | 1/2019 | Bouey et al. |
| 2019/0034930 A1 | 1/2019 | Wolfs et al. |
| 2019/0043052 A1 | 2/2019 | Ledford et al. |
| 2019/0066109 A1 | 2/2019 | Jia et al. |
| 2019/0095919 A1 | 3/2019 | Legault et al. |
| 2019/0164156 A1 | 5/2019 | Lindemann |
| 2019/0318354 A1 | 10/2019 | Weinflash et al. |
| 2019/0340590 A1 | 11/2019 | Davey et al. |
| 2019/0340607 A1 | 11/2019 | Lynn |
| 2019/0394041 A1 | 12/2019 | Jain et al. |
| 2020/0118089 A1 | 4/2020 | Bartrim et al. |
| 2020/0118090 A1 | 4/2020 | Bartrim et al. |
| 2020/0118091 A1 | 4/2020 | Bartrim et al. |
| 2020/0202337 A1 | 6/2020 | Shteynberg et al. |
| 2020/0211028 A1 | 7/2020 | Uju |
| 2020/0302433 A1 | 9/2020 | Green |
| 2020/0356997 A1 | 11/2020 | Barnhardt et al. |
| 2020/0364720 A1 | 11/2020 | Lally et al. |
| 2021/0056196 A1 | 2/2021 | Jain et al. |
| 2021/0141888 A1 | 5/2021 | Hires |
| 2021/0374748 A1 | 12/2021 | Wolfs et al. |
| 2021/0398113 A1 | 12/2021 | Bernert et al. |
| 2022/0129902 A1 | 4/2022 | Edwards et al. |
| 2022/0161756 A1 | 5/2022 | Pylappan |
| 2022/0253842 A1 | 8/2022 | James et al. |

FOREIGN PATENT DOCUMENTS

| | | |
|---|---|---|
| AU | 8870801 | 4/2002 |
| AU | 2002252137 | 9/2002 |
| BR | PI0710021 | 8/2011 |
| BR | PI0710089 | 8/2011 |
| CA | 2229012 | 3/1997 |
| CA | 2239875 | 6/1997 |
| CA | 2323500 | 9/1999 |
| CA | 2329348 | 11/1999 |
| CA | 2316090 | 2/2001 |
| CA | 2402353 | 9/2001 |
| CA | 2423048 | 3/2002 |
| CA | 2437949 | 8/2002 |
| CA | 2436319 | 2/2004 |
| CA | 2647602 | 3/2008 |
| CA | 2647636 | 3/2008 |
| CN | 101454794 | 6/2009 |
| CN | 101454795 | 6/2009 |
| EP | 865010 | 9/1998 |
| EP | 820620 | 3/1999 |
| EP | 998731 | 5/2000 |
| EP | 1107198 | 6/2001 |
| EP | 1184823 | 3/2002 |
| EP | 1208513 | 5/2002 |
| EP | 1400053 | 3/2004 |
| EP | 1416455 | 5/2004 |
| EP | 1504393 | 2/2005 |
| EP | 2008237 | 12/2008 |
| EP | 2013842 | 1/2009 |
| EP | 2266083 | 12/2010 |
| EP | 2304678 | 4/2011 |
| EP | 2344994 | 7/2011 |
| EP | 2387772 | 11/2011 |
| EP | 2407918 | 1/2012 |
| EP | 2407919 | 1/2012 |
| EP | 2438562 | 4/2012 |
| GB | 2297856 | 8/1996 |
| GB | 2384084 | 7/2003 |
| GB | 2454614 | 5/2009 |
| JP | 09282367 | 10/1997 |
| JP | H11265413 | 9/1999 |
| JP | 2000311209 | 11/2000 |
| JP | 2002049872 | 2/2002 |
| JP | 2002298041 | 10/2002 |
| JP | 2003308437 | 10/2003 |
| JP | 2004192437 | 7/2004 |
| JP | 2004532448 | 10/2004 |
| JP | 2005512173 | 4/2005 |
| JP | 2006285329 | 10/2006 |
| JP | 2007128192 | 5/2007 |
| JP | 2008102914 | 5/2008 |
| JP | 2008262601 | 10/2008 |
| JP | 2014132474 | 7/2014 |
| KR | 1020120075590 | 7/2012 |
| KR | 1020140099676 | 8/2014 |
| KR | 101457750 B1 | 11/2014 |
| MX | 2008012503 | 12/2008 |
| MX | 2008012504 | 5/2009 |
| NL | 1018913 | 3/2003 |
| SE | 9703800 | 4/1999 |
| TW | 200919343 | 5/2009 |
| WO | 1997002539 | 1/1997 |
| WO | 1997016798 | 5/1997 |
| WO | 1999024891 | 5/1999 |
| WO | 1999034311 | 7/1999 |
| WO | 1999046720 | 9/1999 |
| WO | 2000055793 | 9/2000 |
| WO | 2000058876 | 10/2000 |
| WO | 2001033522 | 5/2001 |
| WO | 2001055984 | 8/2001 |
| WO | 2001067364 | 9/2001 |
| WO | 2002025534 | 3/2002 |
| WO | 2002025605 | 3/2002 |
| WO | 2002035429 | 5/2002 |
| WO | 2002069561 | 9/2002 |
| WO | 2002073483 | 9/2002 |
| WO | 2003091849 | 11/2003 |
| WO | 2004099910 | 11/2004 |
| WO | 2005004026 | 1/2005 |
| WO | 2005057455 | 6/2005 |
| WO | 2007116368 | 10/2007 |
| WO | 2008011102 | 1/2008 |
| WO | 2008027620 | 3/2008 |
| WO | 2008027621 | 3/2008 |
| WO | 2008110791 | 9/2008 |
| WO | 2009058526 | 5/2009 |
| WO | 2009097215 | 8/2009 |
| WO | 2009114876 | 9/2009 |
| WO | 2009152184 | 12/2009 |
| WO | 2009158420 | 12/2009 |
| WO | 2010039101 | 4/2010 |
| WO | 2010082960 | 7/2010 |
| WO | 2010083113 | 7/2010 |
| WO | 2010138358 | 12/2010 |
| WO | 2010138359 | 12/2010 |
| WO | 2010138611 | 12/2010 |
| WO | 2010138613 | 12/2010 |
| WO | 2010138615 | 12/2010 |
| WO | 2010141662 | 12/2010 |
| WO | 2011008625 | 1/2011 |
| WO | 2011137082 | 11/2011 |
| WO | 2011163525 | 12/2011 |
| WO | 2012075187 | 6/2012 |
| WO | 2012151660 A1 | 11/2012 |
| WO | 2013076436 A1 | 5/2013 |

(56) References Cited

FOREIGN PATENT DOCUMENTS

| WO | 2015154119 | 10/2015 |
|---|---|---|
| WO | 2017011596 | 1/2017 |
| WO | 2017014815 | 1/2017 |
| WO | 2022261147 A1 | 12/2022 |

OTHER PUBLICATIONS

International Search Report and Written Opinion for PCT/US2016/026000, dated Jul. 13, 2016.
International Search Report and Written Opinion for PCT/US11/33828, dated Jul. 12, 2011, 11 pages.
International Search Report for PCT/US10/36231, dated Nov. 8, 2010, 8 pages.
International Search Report for PCT/US10/36233, dated Jul. 28, 2010, 7 pages.
International Search Report for PCT/US10/36229, dated Jul. 28, 2010, 12 pages.
International Search Report for PCT/US10/35465, dated Jul. 13, 2010, 7 pages.
International Search Report for PCT/US09/48490, dated Jul. 31, 2009, 1 page.
"Greg's diary", Aug. 2009, available at http://www.lemis.com/grog/diary-aug2009.php?dirdate=20090807&imagesizes=11111111111111111113#Photo-19.
Trusted Computing Platform Alliance (TCPA), Main Specification Version 1. 1b, Published by the Trusted Computing Group, 2003, 332 pages.
Benson, Carol Coye, "Faster, Better, Cheaper—Like it or Not," http://paymentsviews.com/2013/03/13/faster-better-cheaper-like-it-or-not/, Mar. 13, 2013.
Fiserv, Inc., "Popmoney(R): Instant Payments—Now You Can Deliver Funds in Real Time," Feb. 6, 2014 [retrieved online from https://www.fiserv.com/resources/Popmoney_Instant_Payments_2_06_2014.pdf on Aug. 7, 2015].
Gayle C. Avery, Ellen Baker; Reframing the Infomated Household-Workplace; Information & Organization, 2002, vol. 12, Aug. 2001.
Mark Bernkopf; Electronic Cash and Monetary Policy; First Monday, vol. 1, No. 1-6, May 1996.
Electronic Payment Systems In European Countries; Country Synthesis Report; Bohle, Rader, Riehm, Institut far Technikfolgenabschatzung and Systemanalyse for the European Science and Technology Observatory Network (ESTO); Final Version, Sep. 1999.
Mark E. Budnitz; Electronic Money in the 1990s: A Net Benefit or Merely a Trade-Off?; 9 Ga. St. U. L. Rev. 747, 1992-1993.
Chida, Mambo, Shizuya; Digital Money-A Survey; Received Jun. 15, 2001; Revised Aug. 21, 2001; Interdisciplinary Information Sciences. vol. 7, No. 2, pp. 135-165 (2001).
Harold L. Frohman, William R. Ledder; Defense Transportation's EDI Program: A Security Risk Assessment; PL205LN5; Logistics Management Institute; May 1993.
Aryya Gangopadhyay; Managing Business with Electronic Commerce: Issues & Trends; Idea Group Publishing (2002).
Hans van der Heijden; Factors Affecting the Successful Introduction of Mobile Payment Systems; Vrije Universiteit Amsterdam; 15th Bled Electronic Commerce Conference eReality; Constructing the eEconomy; Bled, Solvenia, Jun. 17-19, 2002.
Lorin M. Hitt and Frances X. Frei; Do Better Customers Utilize Electronic Distribution Channels? The Case of PC Banking; Dec. 2001.
Eun Kim, Petra Schubert, Dorian Seltz and Bumtae Kim; The EBMG Reference Model on Electronic Markets: The Korean Case of JODAL (2007).
Glenbrook Partners; PayPal in the Air!—A look at PayPal Mobile; Payment News; Glenbrook eCommerce Market Analysis Reports (2006).
Sangjo Oh, Heejin Lee, Sherah Kurnia, Robert B. Johnston, Ben Lim; A Stakeholder Perspective on Successful Electronic Payment Systems Diffusion; Proceedings of the 39th Hawaii International Conference on Systems Sciences, 2006.
John R. Palumbo; Naval Postgraduate School, Monterey, California; Thesis, Financial Transaction Mechanisms for World Wide Web Applications, Mar. 1996.
Hua-Fu Pao; Naval Postgraduate School, Monterey, California; Thesis, Security Management of Electronic Data Interchange; Jun. 1993.
Tobern P. Pedersen; Electronic Payments of Small Amounts; Aarhus University (1998).
Eveline Franco Veloso; The Business Revolution through B2B Market Tone and its Impacts over the Financial System gong into 21st Century; The Institute of Brazilian Business and Management Issues; XII Minerva Program-Fall 2000, 2000.
Alladi Venkatesh and Nicholas Vitalari; Households and Technology: The Case of Home Computers-Some Conceptual and Theoretical Issues; originally appeared in M.L. Roberts and L. Wortzel (eds.) Marketing to the Changing Household, Ballinger Publishing, 1985, pp. 187-203.
A. Vilmos and S. Narnouskos; SEMOPS: Design of a New Payment Service; International Workshop on Mobile Commerce Technologies & Applications (MCTA 2003), In proceedings of the 14th International Conference DEXA 2003, Sep. 1-5, 2003, Prague, Czech Republic.
Raja Mohn Rosli bin Raja Zulkifli; Building a World Class Infrastructure to Support E-Commerce in Malaysia; 1997 Telekom Malaysia, 1997.
Chang et al., "Smart Phone for Mobile Commerce," Computer Standards & Interfaces 31.4, pp. 740-747, 2009.
NACHA (Business-to-Business EIPP: Presentment Models and Payment Options, http://euro.ecom.cmu.edu/resources/elibrary/epay/B2BPaymentOptions.pdf, 2001), (Year: 2001).
International Trade Administration (export.gov), "Chapter 1: Methods of Payment in International Trade," https://2016.export_gov/tradefinanceguide/eg_main_043221.asp, Nov. 7, 2012 (Year: 2012).
NoPass, "No Password Login | Touch ID Fingerprint iPhone App," available at https://web.archive.org/web/20150328095715/http://www.nopassapp.com/, Mar. 28, 2015.
Constant Contact Tech Blog, "iOS Security: How Apple Protects Data on IOS Devices—Part 1," available at https://web.archive.org/web/20150403175348/https://techblog.constantcontact.com/software-development/ios-security/, Dec. 8, 2014.
NoPass, "Register," available at https://web.archive.org/web/20141222172212/http://www.nopassapp.com/register/, Dec. 22, 2014.
NoPass, "Login," available at https://web.archive.org/web/20141222170523/http://www.nopassapp.com/login/, Dec. 22, 2014.
Apple, "iOS Security," available at https://web.archive.org/web/20140226213513/http://images.apple.com/iphone/business/docs/iOS_Security_Feb14.pdf, Feb. 2014.
EBay Developers Program, "eBay Web Services XML API Guide," 2005.
Federal Financial Institutions Examination Council (Wholesale Payment System, https://ithandbook.ffiec.gov/media/274899/ffiec_itbooklet_wholesalepaymentsystems.pdf, Section 4, Jul. 2004.
Oldfield et al., "The Place of Risk Management in Financial Institutions," The Wharton School, Financial Institutional Center, University of Pennsylvania, 1995.
The PayPal Account, Chapter 2, link.springer.com, Apr. 30, 2007.
Provident Bank, Universal Payment Identification Code (UPIC) guide (Year: 2016).
Gajek, Sebastian, et al., "TruWallet: Trustworthy and Migratable Wallet-Based Web Authentication," Proceedings of the 2009 ACM Workshop on Scalable Trusted Computing, 2009, (year: 2009).
Hosseini, Z.Z. and Barkhordari, E., "Enhancement of Security with the Help of Real Time Authentication and One Time Password in e-Commerce Transactions," The 5th Conference on Information and Knowledge TEchnology, SHiraz, Iran, 2013, pp. 268-273 2013.
Peters, M., "3 Reasons a Digital World Requires Digital Payments—Why franchisees should consider integrated software for payment processing," Franchising World, pp. 32-33 Nov. 2018.
J Christopher Westland; Theordore H. Clark, "Secure Digital Payment, " in Global Electronic Commerce: Theory and Case Studies, MIT Press, 1999, pp. 465-528. 1999.

(56) References Cited

OTHER PUBLICATIONS

PayPal introduces global payments platform PayPal X, Nov. 5, 2009, https://thepaypers.com/online-payments/paypal-introduces-global-payments-platform-paypal-x-x739940# (The Payers, Year: 2009) Nov. 2009.

Wang, Xin & Xu, Xiaomin & Feagan, Lance & Huang, Sheng & Jiao, Limei & Zhao, Wei. (2018). Inter-Bank Payment System on Enterprise Blockchain Platform. 2018 IEE 11th International Conference on Cloud Computing (CLOUD), San Franscico, CA, USA, 2018, pp. 614-621 (Interbank) (Year: 2018) 10.1109/CLOUD.2018.00085. 2018.

Makki S. et al., "Fraud Analysis Approached in the Age of Big Data—A Review of State of the Art," 2017 IEEE 2nd International Workshops on Foundations and Applications of Self Systems (FASW), Tucson, AZ, 2017, pp. 243-250, doi: 10.1109/FAS-W.2017.154 2017.

\* cited by examiner

DIRECT ELECTRONIC BILL PAYMENT WITH REAL-TIME FUNDS AVAILABILITY

CROSS-REFERENCE TO RELATED APPLICATION

This application claims the benefit of U.S. Provisional Application No. 63/239,107, filed Aug. 31, 2021. U.S. Provisional Application No. 63/239,107 is incorporated herein by reference in its entirety.

TECHNICAL FIELD

This disclosure relates generally to transaction processing, and relates more particularly to direct electronic bill payment with real-time funds availability.

BACKGROUND

In conventional payment methods, after a biller sends a bill to a customer, the customer can initiate a payment to the biller through various different methods, such as through the customer's financial institution, a consolidated bill-pay provider, or the biller's financial institution, for example. These conventional methods, however, generally do not allow the biller to receive payment funds in real-time after the customer has initiated the payment to the biller, and generally involve the customer providing the biller with personal information, such as an account number, which can create security vulnerabilities.

BRIEF DESCRIPTION OF THE DRAWINGS

To facilitate further description of the embodiments, the following drawings are provided in which.

Figure 1:
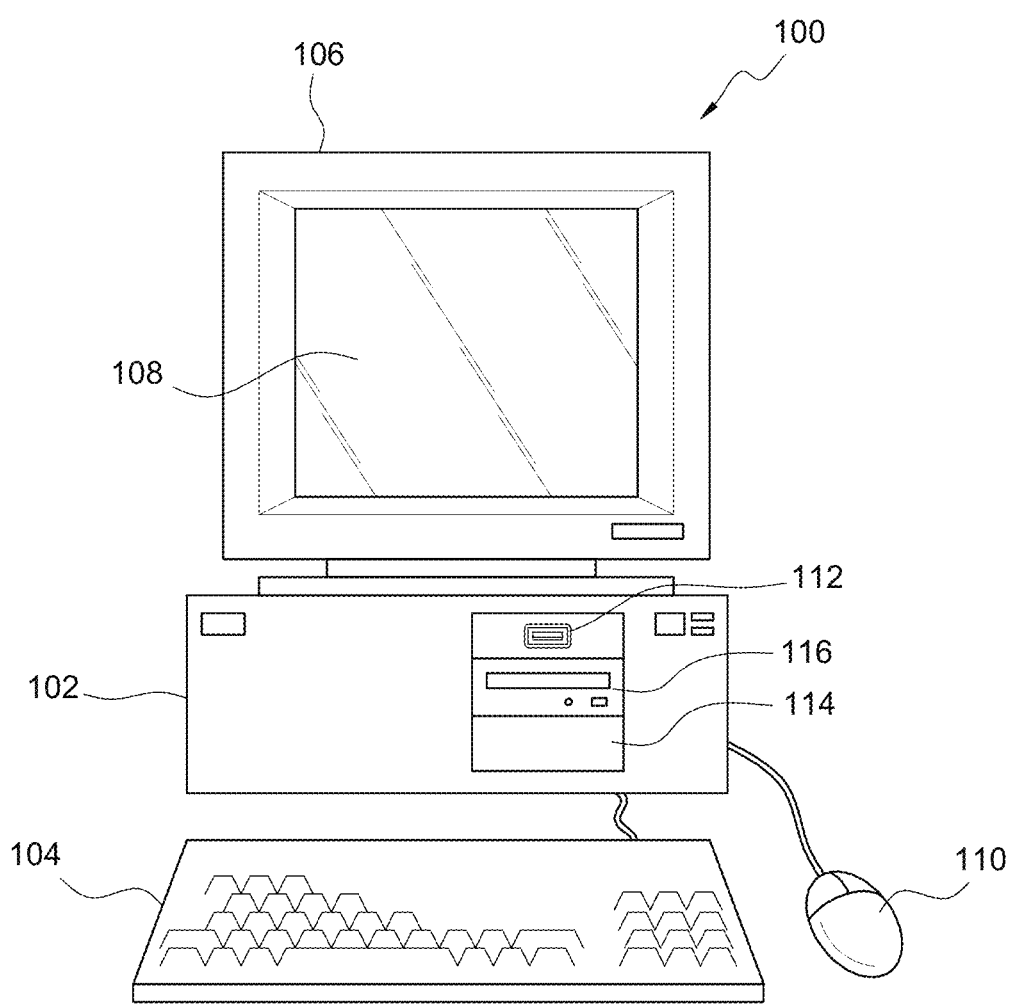
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately 1 second, 5 seconds, 10 seconds, 30 seconds, 1 minute, 2 minutes, 5 minutes, 10 minutes, or 15 minutes.

DESCRIPTION OF EXAMPLES OF EMBODIMENTS

Figure 2:
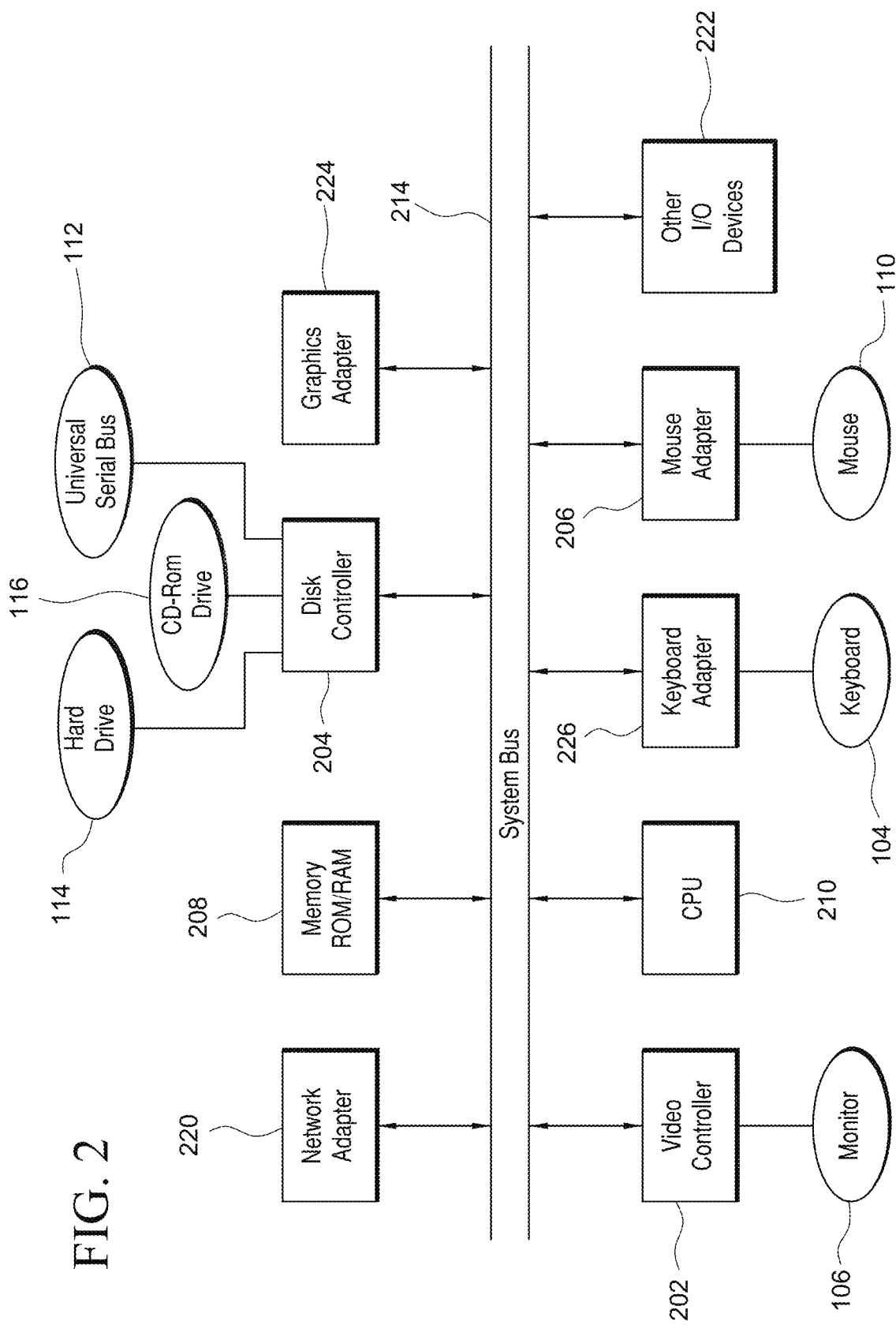
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, or (v) the Windows Mobile™ operating system by Microsoft Corp. of Redmond, Washington, United States of America.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general-purpose computer to a special purpose computer. For purposes of illustration, programs and other executable program components are shown herein as discrete systems, although it is understood that such programs and components may reside at various times in different storage components of computing system 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
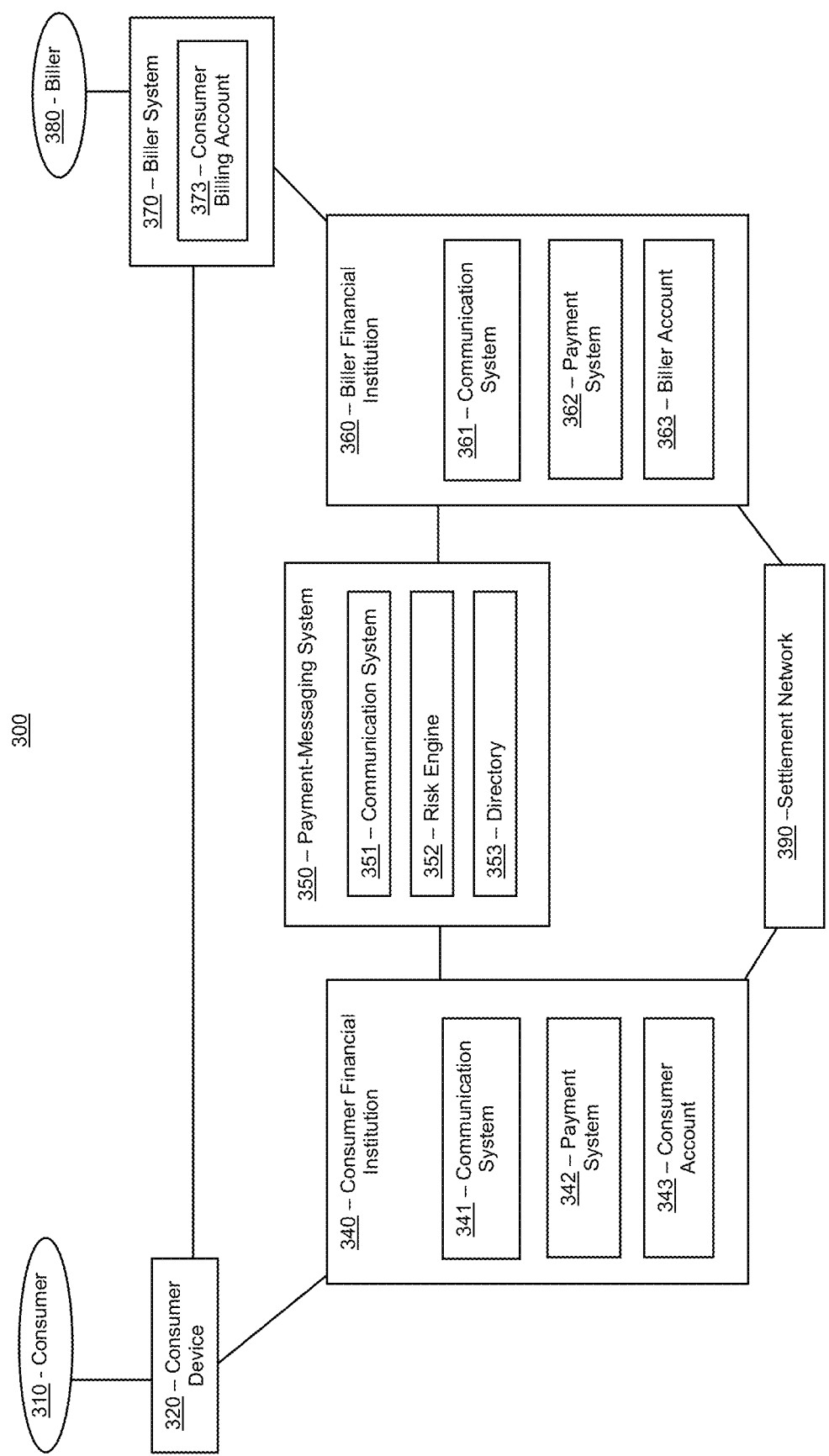
FIG. 3 illustrates a block diagram of a system that can be employed for direct electronic bill payment with real-time funds availability, according to an embodiment.

Turning ahead in the drawings, FIG. 3 illustrates a block diagram of a system 300 that can be employed for direct electronic bill payment with real-time funds availability, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include a consumer 310, a consumer device 320, a consumer financial institution 340, a payment-messaging system 350, a biller financial institution 360, a biller system 370, a biller 380, and/or a settlement network 390. Consumer device 320, consumer financial institution 340, payment-messaging system 350, biller financial institution 360, biller system 370, and/or a settlement network 390 can each be or include a computer system, such as computer system 100 (FIG. 1), as described above, and can each be a single computer, a single server, or a cluster or collection of computers or servers, or a cloud of computers or servers. In some embodiments, various systems of system 300 (e.g., consumer device 320, consumer financial institution 340, payment-messaging system 350, biller financial institution 360, biller system 370, and/or a settlement network 390) can be in data communication with one or more of the other systems of system 300 through one or more networks, such as the Internet or other suitable networks (not shown).

In a number of embodiments, consumer device 320 can be used by consumer 310, which can be a person or entity that can make a direct bill payment to biller 380 using system 300. In many embodiments, consumer 310 can have a consumer account 343 maintained at a consumer financial institution 340. Consumer account 343 can be an account used to fund the payment, such as a demand deposit account of consumer 310 maintained at consumer financial institution 340. In a number of embodiments, consumer 310 can access consumer financial institution 340 through consumer device 320, such as through a web portal, web application, or mobile wallet provided by consumer financial institution 340. In a number of embodiments, consumer device 320 can communicate with a communication system 341 at consumer financial institution 340, such as a digital banking system provided by consumer financial institution 340.

In several embodiments, biller system 370 can be used by biller 380, which can be a person or entity that can receive a bill payment from consumer 310 using system 300. In some embodiments, biller system 370 can be a system provided by a billing service provider (BSP), which can be a third-party service provider used by biller 380 to handle bill processing. In many embodiments, biller 380 can have a biller account 363 maintained at a biller financial institution 360. Biller account 363 can be an account used to receive the payment, such as a demand deposit account of biller 380 at biller financial institution 360. In a number of embodiments, biller 380 can access biller financial institution 360 through biller system 370, such as through a web portal, web application, or mobile application provided by biller financial institution 360. In some embodiments, consumer 310 can be a customer or consumer of biller 380, and biller 380 can be a biller, such as a merchant, a utility company, a bank, a school, a government, a service provider, or another suitable provider of goods and/or services to consumer 310. In several embodiments, biller system 370 can include a billing system to track accounts of customers (e.g., consumer 310). In a number of embodiments, consumer 310 can have a consumer billing account 373 at biller system 370 that tracks how much consumer 310 owes biller 380. For example, the billing account can track how much consumer 310 owes biller 380 for a credit card, an auto loan, a mortgage, a utility service, etc. Biller 380 generally sends bills (e.g., invoices) to request payment from customers, such as consumer 310, and these bills can be sent periodically or on a one-time basis. In a number of embodiments, biller system 370 can communicate with a communication system 361 at biller financial institution 360, such as a corporate portal provided by biller financial institution 360.

In many embodiments, payment-messaging system 350 can be in data communication with various financial institutions, such as consumer financial institution 340 and biller financial institution 360. In some embodiments, payment-messaging system 350 can be a payment-messaging network provided by an entity separate from consumer financial institution 340 and biller financial institution 360, such as the Zelle® network provided Early Warning Services, LLC, of Scottsdale, Arizona, or another suitable entity.

In several embodiments, settlement network 390 can be in data communication with various financial institutions, such as consumer financial institution 340 and biller financial institution 360, and in some embodiments, can be in data communication with payment-messaging system 350. In some embodiments, settlement network 390 can be a settlement network provided by an entity separate from consumer financial institution 340 and biller financial institution 360, such as ACH (Automated Clearing House), or another suitable settlement network. In many embodiments, settlement network 390 can communicate with payment hubs at financial institutions, such as a payment system 342 at consumer financial institution 340 and a payment system 362 at biller financial institution 360.

In certain embodiments, consumer device 320 and/or biller system 370 can be desktop computers, laptop computers, mobile devices, computer servers, and/or other endpoint devices. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

In many embodiments, payment-messaging system 350 and/or the systems of consumer financial institution 340 and biller financial institution 360 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to payment-messaging system 350 and/or the systems of consumer financial institution 340 and biller financial institution 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of payment-messaging system 350 and/or the systems of consumer financial institution 340 and biller financial institution 360. In a similar manner, the processors and/or the non-transitory computer-readable media can be local and/or remote to each other.

Meanwhile, in many embodiments, payment-messaging system 350 and/or the systems of consumer financial institution 340 and biller financial institution 360 also can be configured to communicate with one or more databases. For example, payment-messaging system 350 can include a database system, such as directory 353. Directory 353 can include profile information about users that have registered to facilitate payments using payment-messaging system 350. For example, once consumer 310 registers with payment-messaging system 350, such as through consumer financial institution 340, consumer financial institution 340 can provide a payment profile identification data structure to payment-messaging system 350, which can include one or more public identifiers of consumer 310, such as an email address, phone number, or other suitable public identifier of consumer 310, and can include a tokenized identifier (e.g., a Zelle tag provided by the Zelle network) that can represent consumer account 343 without including the account number of consumer account 343. In many embodiments, the tokenized identifier was provided to payment-messaging system 350 by consumer financial institution 340 when consumer 310 registered to use payment-messaging system 350. In many embodiments, consumer financial institution 340 can maintain a mapping from the tokenized identifier to account information for consumer account 343. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, payment-messaging system 350, the systems of consumer financial institution 340 and biller financial institution 360, and/or one or more of the databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, payment-messaging system 350 can include a communication system 351, a risk engine 352, and/or a directory 353. In many embodiments, the systems of payment-messaging system 350 can be modules of computing instructions (e.g., software modules) stored at non-transitory computer readable media that operate on one or more processors. In other embodiments, the systems of payment-messaging system 350 can be implemented in hardware. Payment-messaging system 350 can be a computer system, such as computer system 100 (FIG. 1), as described above, and can be a single computer, a single server, or a cluster or collection of computers or servers, or a cloud of computers or servers. Additional details regarding payment-messaging system 350 and the components thereof are described herein.

In several embodiments, consumer 310 can use consumer device 320 to access a bill payment portal (e.g., a website) provided by biller system 370 to make a payment to biller 380. In conventional bill payment portals, consumer 310 can make a payment to biller 380 by providing account information, such as a checking account number, a credit card number, a debit card number, or other payment account information. This personal information can be sensitive information that poses a security risk, such as being used by bad actors to make unauthorized charges to consumer account 343 and/or other security risks. Many biller systems (e.g., 370) store such sensitive data of consumers (e.g., 310), which poses security risks of bad actors obtaining unauthorized access to this sensitive data. Billers (e.g., 380) often maintain costly compliance programs, and are liable for returns and processing fees incurred using these conventional payment options. In many embodiments, system 300 can advantageously enable consumer 310 to make direct bill payments to biller 380 by providing a public identifier (e.g., email address, phone number, etc.) of consumer 310 to biller 380, without providing personal information, such as bank account numbers, credit card numbers, etc.

Figure 4:
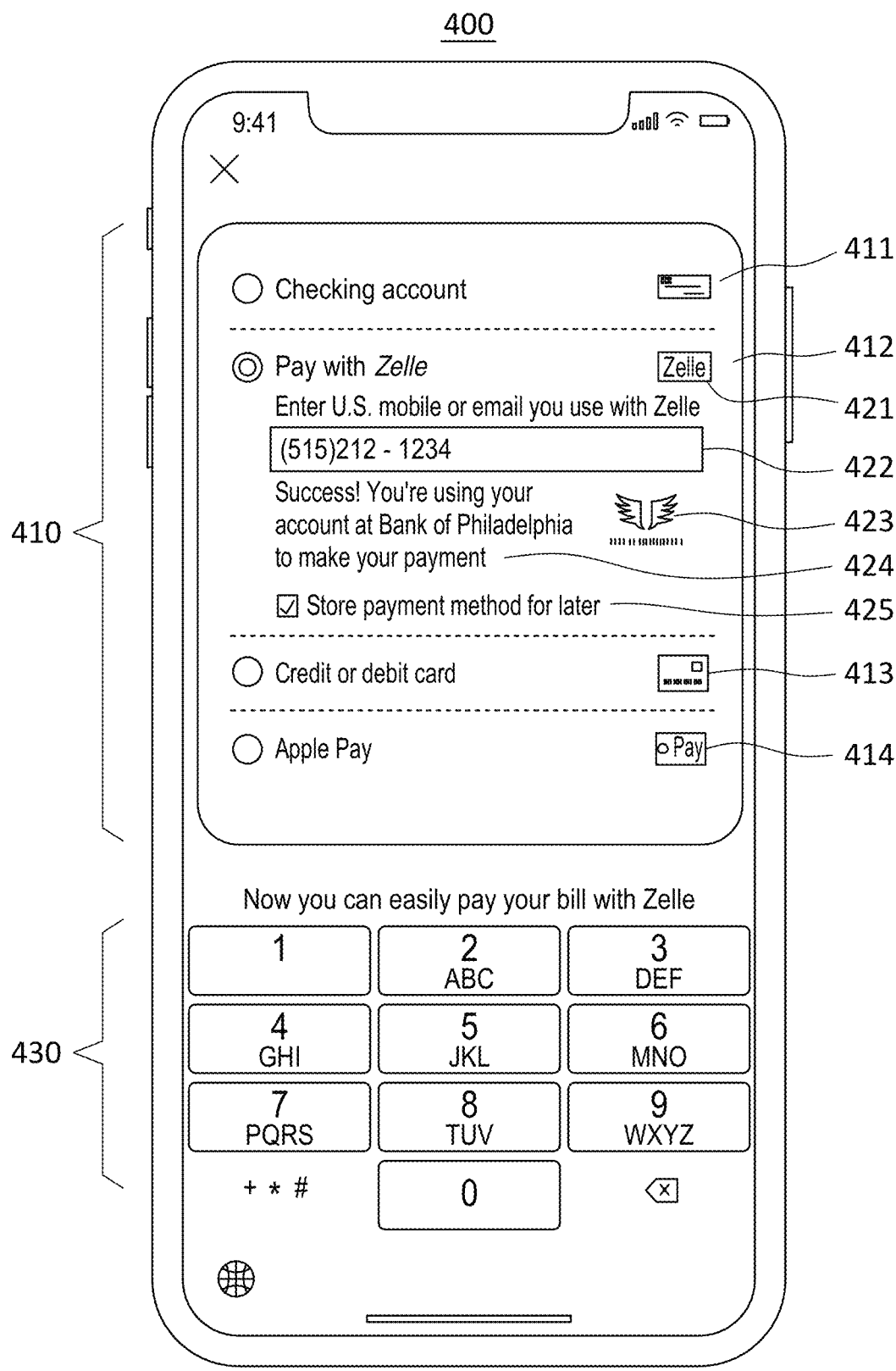
FIG. 4 illustrates an exemplary display screen of a mobile device to allow the consumer of FIG. 3 to make a direct bill payment to the biller of FIG. 3 using a public identifier.

Turning ahead in the drawings, FIG. 4 illustrates an exemplary display screen 400 of a mobile device to allow consumer 310 (FIG. 3) to make a direct bill payment to biller 380 (FIG. 3) using a public identifier (e.g., email address, phone number, etc.). Display screen 400 is merely exemplary, and embodiments of the display screen are not limited to the embodiments presented herein. The display screen can be employed in many different embodiments or examples not specifically depicted or described herein, and can include other suitable elements. In many embodiments, biller system 370 (FIG. 3) can provide an interface for display on consumer device 320 (FIG. 3) (e.g., as a mobile device), which can include display screen 400. In a number of embodiments, the interface can allow consumer 310 (FIG. 3) to initiate the direct payment to biller 380 (FIG. 3) and provide the public identifier (e.g., email address, phone number, etc.).

In many embodiments, display screen 400 can include payment method options 410, one of which can be selected by consumer 310 (FIG. 3) to make the payment. Some of these payment methods can be conventional, such as using an option 411 to use a checking account, an option 413 to use a credit or debit card, or an option 414 to use Apple Pay. In several embodiments, display screen 400 additionally, or alternatively, can include, among payment method options 410, an option 412 of using payment-messaging system 350 (FIG. 3). In some embodiments, payment-message system 350 can be Zelle, which can be represented by a logo 421. In many embodiments, display screen 400 can allow consumer 310 (FIG. 3) of payment-messaging system 350 to enter a public identifier (e.g., email, phone number, etc.) in a public identifier input field 422, such as by using a virtual keypad 430. The public identifier can be used to make the payment. In some embodiments, the public identifier was already used by consumer 310 (FIG. 3) to sign up for payment-messaging system 350 (FIG. 3) using the public identifier. For example, as shown in FIG. 4, consumer 310 (FIG. 3) can enter the phone number of consumer 310 (FIG. 3) in public identifier input field 422, which has already been registered with payment-messaging system 350 (FIG. 3). In many embodiments, display screen 400 can display an informational message 424 to inform consumer 310 (FIG. 3) of which financial institution (e.g., 340 (FIG. 3)) will be used for the payment through payment-messaging system 350 (FIG. 3), and/or a logo 423 for that financial institution can be displayed. In a number of embodiments, display screen 400 also can provide a selector 425 to allow consumer 310 (FIG. 3) to indicate whether or not the option 412 of using payment-messaging system 350 (FIG. 3), along with the public identifier entered in public identifier input field 422 should be stored, to allow that payment method to be readily used in future transactions.

Figure 5:
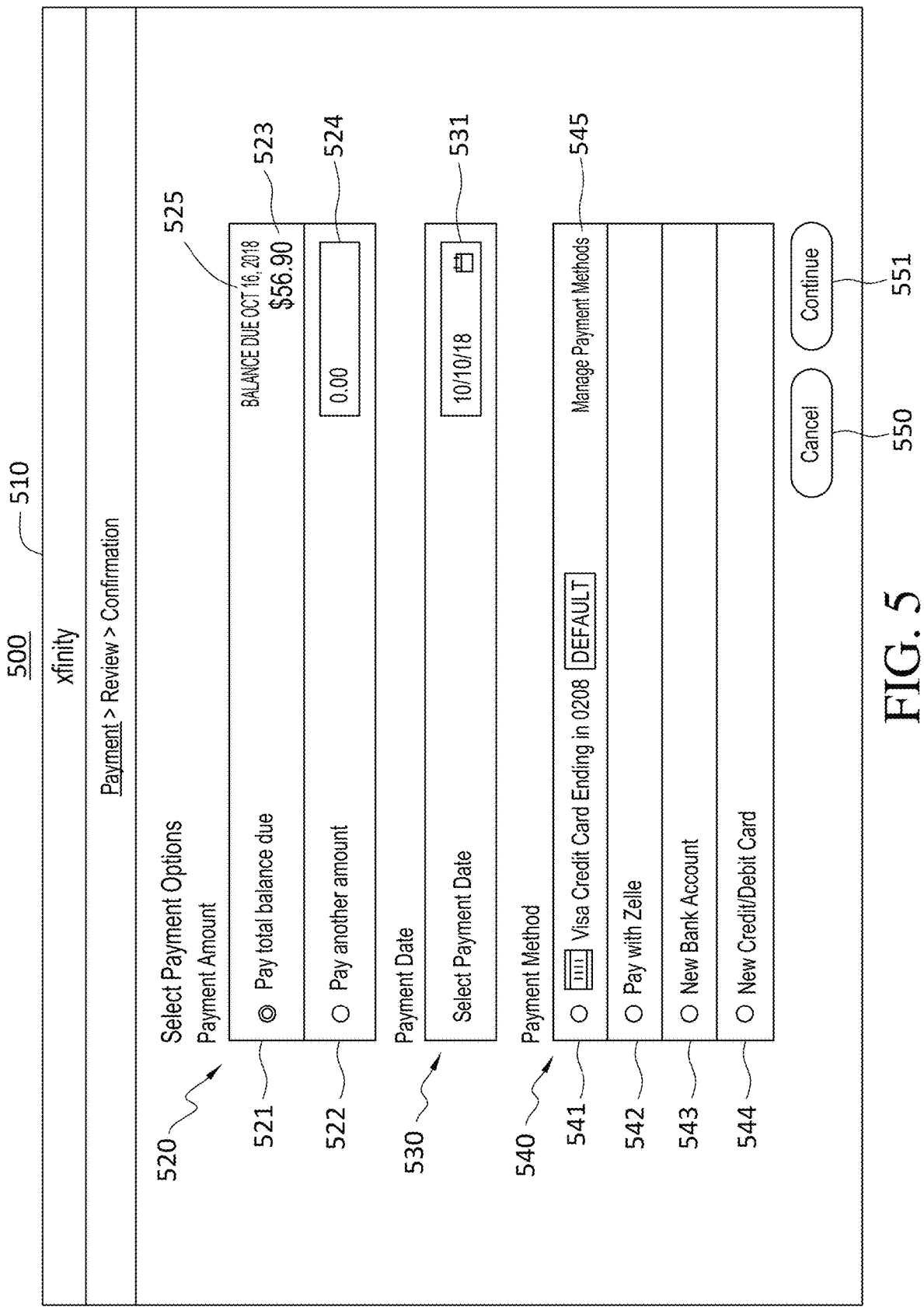
FIG. 5 illustrates an exemplary display screen of a computer to allow the consumer of FIG. 3 to make a direct bill payment to the biller of FIG. 3 using a public identifier.

Turning ahead in the drawings, FIG. 5 illustrates an exemplary display screen 500 of a computer (e.g., laptop, desktop, etc.) to allow consumer 310 (FIG. 3) to make a direct bill payment to biller 380 (FIG. 3) using a public identifier (e.g., email address, phone number, etc.). Display screen 500 is merely exemplary, and embodiments of the display screen are not limited to the embodiments presented herein. The display screen can be employed in many different embodiments or examples not specifically depicted or described herein, and can include other suitable elements. Display screen 500 can be similar to display screen 400 (FIG. 4). In many embodiments, the interface provided by biller system 370 (FIG. 3) can be displayed on consumer device 320 (FIG. 3) (e.g., as a laptop, desktop, etc.), which can include display screen 500. In a number of embodiments, the interface can allow consumer 310 (FIG. 3) to initiate the direct payment to biller 380 (FIG. 3) and provide the public identifier (e.g., email address, phone number, etc.).

In a number of embodiments, display screen 500 can be used to initiate the direct payment to a biller (e.g., Xfinity), and the name and/or logo of the biller can be shown on a title bar 510 of display screen 500. In many embodiments, display screen can allow consumer 310 (FIG. 3) to select payment options, such as payment amount, payment date, payment method, and/or other suitable options. For example, display screen can allow consumer 310 (FIG. 3) to select the payment amount in payment amount options 520. Payment amount options 520 can allow consumer 310 (FIG. 3) to select a pay total balance due option 521 to pay the total balance due in consumer billing account 373 (FIG. 3). The total amount due can be shown in total amount due display field 523, and the due date can be displayed in due date display field 525. Instead, consumer 310 (FIG. 3) can select a pay another amount option 522 to enter another amount in payment amount input field 524. In some embodiments, display screen 500 can allow consumer 310 (FIG. 3) to select a payment date in payment date option 530. For example, the date can be input in payment date input field 531, which can be used by consumer 310 (FIG. 3) to enter the current date or a specific date in the future. In many embodiments, display screen 500 can include payment method options 540, which can be similar or identical to payment method options 410 (FIG. 4) shown on display screen 400 (FIG. 4). In some embodiments, payment method options 540 can be conventional, such as an option 541 to use a credit card or debit card that has already been setup, an option 543 to use a bank account that has not yet been setup, and/or an option 544 to use a credit card or debit card that has not yet been setup. In several embodiments, display screen 500 additionally, or alternatively, can include, among payment method options 410, an option 542 of using payment-messaging system 350 (FIG. 3), which can allow consumer 310 (FIG. 3) of payment-messaging system 350 to enter a public identifier to make the payment, such as based on consumer 310 (FIG. 3) having already registered the public identifier in payment-messaging system 350 (FIG. 3). In many embodiments, a button/link 545 can allow consumer 310 (FIG. 3) to manage payment options that have already been setup.

Figure 6:
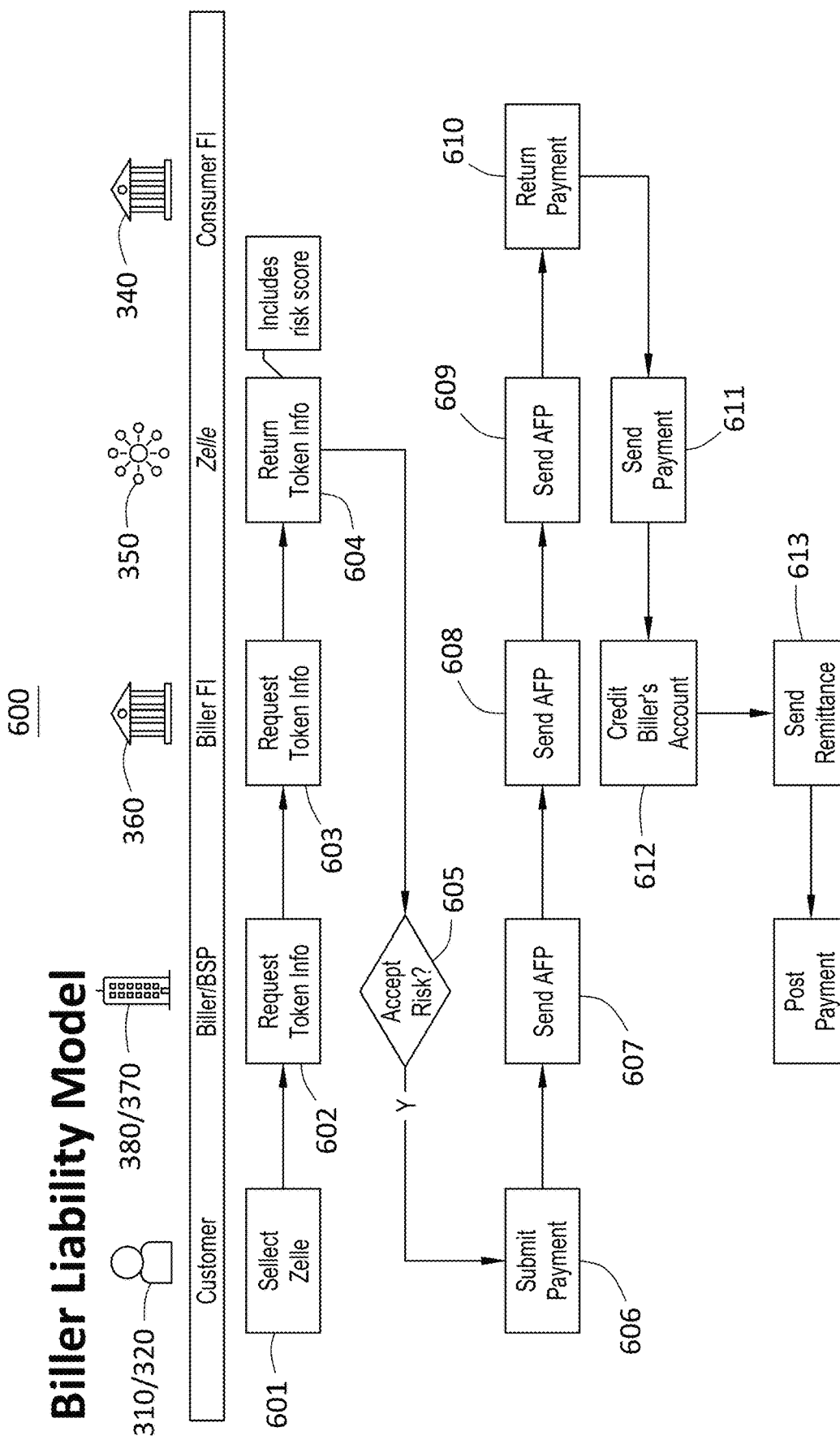
FIG. 6 illustrates a flow chart for a method of facilitating direct electronic bill payment with real-time funds availability in a biller liability model, according to an embodiment.

Turning ahead in the drawings, FIG. 6 illustrates a flow chart for a method 600 of facilitating direct electronic bill payment with real-time funds availability in a biller liability model, according to an embodiment. Method 600 is merely exemplary and is not limited to the embodiments presented herein. Method 600 can be employed in many different embodiments or examples not specifically depicted or described herein. In some embodiments, the procedures, the processes, and/or the activities of method 600 can be performed in the order presented. In other embodiments, the procedures, the processes, and/or the activities of method 600 can be performed in any suitable order. In still other embodiments, one or more of the procedures, the processes, and/or the activities of method 600 can be combined or skipped.

In many embodiments, system 300 (FIG. 3) can be suitable to perform method 600 and/or one or more of the activities of method 600, such as activities 601-614. In these or other embodiments, one or more of the activities of method 600 can be implemented as one or more computing instructions configured to run at one or more processors and configured to be stored at one or more non-transitory computer readable media. Such non-transitory computer readable media can be part of system 300. The processor(s) can be similar or identical to the processor(s) described above with respect to computer system 100 (FIG. 1). In some embodiments, method 600 and other activities in method 600 can include using a distributed network including distributed memory architecture to perform the associated activity. This distributed architecture can reduce the impact on the network and system resources to reduce congestion in bottlenecks while still allowing data to be accessible from a central location.

Referring to FIG. 6, method 600 can begin with an activity 601 of consumer 310 using consumer device 320 (together consumer 310 and consumer device 320 are referred to in FIG. 6 as "customer") to select, on a bill payment portal provided by biller system 370, a payment method of using payment-messaging system 350 (e.g., Zelle), such as shown in FIGS. 4 and/or 5, and described above. As described above, part of consumer 310 selecting this payment method can involve consumer 310 providing the public identifier that consumer 310 has previously registered with payment-messaging system 350. The public identifier (sender token) can be sent from consumer device 320 to biller system 370 (which can be controlled by biller 380 or a third-party service provider, such as a BSP).

Next, at activity 602, biller system 370 can request additional information about the sender token by sending a request to biller financial institution 360. At activity 603, biller financial institution 360 can send the request to payment-messaging system 350. This request for additional information about the token can ask payment-messaging system 350 to validate if the sender token can be used to authorize the payment using payment-messaging system 350, which can involve, in a number of embodiments, performing a risk determination and returning a risk metric (e.g., risk score). In many embodiments, the request for additional information can include information about consumer 310 provided by biller system 370, based on the user profile of consumer 310 that is logged into biller system 370. For example, the information from the user profile can include name information (e.g., first name, middle name, last name, and/or full name) of the consumer, address information (e.g., residential street address, city, state, postal code), email address information, phone number information, duration of the consumer account with the biller, profile change event history, IP (internet protocol) address and/or reputation information from which the login to biller system 370 occurred, browser information, and/or other suitable information about consumer 310.

Next, at activity 604, payment-messaging system 350 can determine whether the sender token can be used to authorize a payment by validating the sender token, which can include checking if the sender token is registered and active in directory 353 (FIG. 3) of payment-messaging system 350, determining how long the sender token has been registered, and/or determining whether the sender token is a known bad token.

In many embodiments, when the sender token is a phone number, payment-messaging system 350 can request information associated with the phone number from the mobile network operator (MNO) at which the phone number is registered, or use such information if it has been already obtained. For example, the mobile network operator can provide name information (e.g., first name, middle name, last name, and/or full name) of the consumer, address information (e.g., residential street address, city, state, postal code), email address information; phone status information, device information (e.g., obtained based on an mSDK (mobile software development kit)) if consumer 310 (FIG. 3) is using a mobile device, and/or other suitable information.

In some embodiments, the phone status information can include tenure of the relationship with the MNO, name of the MNO, porting events, phone number change events, network status (e.g., whether the account associated with the phone number is active or deactivated), SIM (subscriber identity module) card swap events, SIM operator name, SIM serial number, IMEI (International Mobile Equipment Identity) information, device change events, account type, account role (e.g., owner, member, etc.), user type (e.g., personal, business government, wholesale, employee, unknown), phone number change events, velocity, porting velocity, porting status, line type (e.g., mobile, landline, fixed VoIP (voice over internet protocol), non-fixed VoIP, other), and/or other suitable information. In many embodiments, a phone identity verification service, e.g., Prove API, can be used to provide some or all of the MNO information and/or phone information. In several embodiments, payment-messaging system 350 can compare the user profile information received from biller system 370 and the information received from the MNO to do name matching, address matching, and/or email address matching to determine if the information for consumer 310 matches.

If the sender token is an email address, information about the user associated with the email address can be obtained, such as by using a third-party email identity verification service, such as Emailage. For example, the first name and last name of the user associated with the email address can be obtained. This information can be compared with the user profile information obtained from biller system 370.

In a number of embodiments, payment-messaging system 350 can use the information to perform a risk analysis. In many embodiments, one or more of these factors can be used by a risk engine to determine a risk metric (e.g., risk score). For example, contextual information can be received from biller 380, biller system 370, biller financial institution 360, one or more third parties (e.g., resellers), etc. The contextual information can include customer contextual information about the customer relationship between consumer 310 can biller 380 (e.g., duration with biller, profile change history, address, other data about the customer), location contextual information about consumer 310 (e.g., city, state, country, geo location, etc.), device contextual information (e.g., mobile carrier name, SIM operatory, SIM serial number/IMEI, browser information), network contextual information (e.g., IP address/reputation), and/or other suitable information, and/or other suitable contextual information.

In some embodiments, the risk engine can respond with one of three status responses (e.g., Green, Yellow, or Red) on whether a payment can be authorized for the sender token (i.e., passive authentication). For the Green status, the sender token was successfully authenticated. For the Yellow status, the sender token requires additional active authentication, such as a step-up authentication through one-time passcode, an identity authentication service (e.g., OpenID Connect (OIDC), XID, OAuth, etc.), or another authentication method (e.g., push notification, etc.). In some embodiments, the step-up authentication method to be used can be selected by biller 380, biller system 370, biller financial institution 360, and/or consumer financial institution 340. For the Red status, consumer 310 is declined, and the sender token may not be used for the payment. In many embodiments, other metrics can be used, such as numeric, alphabetic, alphanumeric, scores, reason codes, attributes, rankings, and/or other suitable metrics. In several embodiments, activity 604 can include payment-messaging system 350 returning this information (e.g., whether the token can be used and/or the risk metric) to biller system 370, which in many embodiments can be returned through biller financial institution 360. In some embodiments, payment-messaging system 350 can include the tokenized identifier associated with the sender token from directory 353 (FIG. 3).

Next, at activity 605, biller 380 and/or biller system 370 can determine whether to accept the liability for the payment. This determination of whether to accept liability can be based on the information returned to biller system 370. For example, if the sender token cannot be used to authorize the payment (e.g., Red status), then the payment does not proceed. If the sender token can potentially be used to authorize the payment (e.g., Yellow or Green status), then, in many embodiments, biller system 370 can determine whether to accept liability for the payment, based on the risk metric (e.g., risk score) provided by payment-messaging system 350. In many embodiments, with Green status, biller system 370 can determine to accept liability, and for Yellow status, biller system can perform additional authentication, such as the step-up authentication. For example, in some embodiments, biller system 370 can send a one-time passcode to the sender token, after which, if consumer 310 is able to access the system associated with the sender token, consumer 310 can enter the one-time passcode in the bill payment portal to provide authentication.

If the biller 380 and/or biller system 370 ultimately decides to accept liability, then method 600 proceed to activity 606, at which consumer 310 can submit the payment. In many embodiments, the bill payment portal can enable a button that allow the user to submit the payment request. Next, at activity 607, an Authorization for Payment (AFP) message can be generated by biller system 370, and the AFP message which can be sent to biller financial institution 360. In many embodiments, the AFP message can include a flag or other indicator that biller 380 is accepting liability of the payment. The AFP can be treated as a preapproved Payment Request, which can be a message that contains a request for payment funds and an approval for consumer financial institution 340 to fulfil the request upon receipt.

In a number of embodiments, unlike other "credit push" transactions that can be initiated by consumer 310, such as a payment request initiated by consumer 310 at consumer financial institution 340 to send a payment from consumer 310 to a payee (e.g., biller 380)), in many embodiments, the payment request can appear to consumer 310 to be a "debit pull" transaction, biller system 370 of biller 380 is requesting that funds be pulled from consumer 310 and provided to biller 380. In several embodiments, this "debit pull" approach can conceal a payment request from consumer 310, such that after consumer 310 initiates, at biller system 370 of biller 380, a payment request that funds be pulled from consumer 310 and provided to biller 380, consumer 310 does not receive a request from consumer financial institution 340 to verify whether or not consumer 310 in fact initiated the payment request at biller system 370. In other words, once initiated by consumer 310 at biller system 370, the payment can be automated without consumer 310 doing anything further. In many embodiments, the new AFP message can provide this functionality. In some embodiments, whether or not the payment request is concealed from consumer 310 can depend on biller 380, biller financial institution 360, and/or consumer financial institution 340.

At activity 608, the AFP message can be sent from biller financial institution 360 to payment-messaging system 350. In some embodiments, payment-messaging system 350 can determine whether the requestor (biller 380, biller system 370, and/or biller financial institution 360) sending the AFP message is registered and authorized to send the AFP message using the direct electronic bill payment with real-time funds availability techniques described herein. If so, next, at activity 609, payment-messaging system 350 can send the AFP message to consumer financial institution 340. In many embodiments, the tokenized identifier associated with the sender token from directory 353 (FIG. 3) can be used to know which consumer financial institution (e.g., 340) is associated with consumer 310 based on the sender token. The tokenized identifier can be used by consumer financial institution 340 to identify consumer account 343 (FIG. 3), based on a mapping from the tokenized identifier to an account identifier of consumer account 343 that is stored within consumer financial institution 340.

Next, at activity 610, consumer financial institution 340 can debit consumer account 343 (FIG. 3) (e.g., pull funds using a memo post) and can send a payment message to payment-messaging system 350. In many embodiments, the payment message can include an irrevocable promise to pay from consumer financial institution 340 to biller financial institution 360. In many embodiments, the payment message can be a credit push that is concealed from consumer 310. At activity 611, payment-messaging system 350 can send the payment message to biller financial institution 360. At activity 612, biller financial institution 360 can credit biller account 363 (FIG. 3) with the funds. In some embodiments, at activity 612, biller financial institution can send a change payment status message to payment-messaging system 350, indicating that the payment has been credited to biller account 363 (FIG. 3), which in some embodiments can be processed using a new service and notification set for change payment status. At activity 613, biller financial institution 360 can send a remittance message to biller system 370. At activity 614, upon receipt of the remittance message, biller system 370 can generate a confirmation number and post the payment to consumer billing account 373 (FIG. 3). In many embodiments, the confirmation number can be sent from biller system 370 to consumer device 320 to show to consumer 310 through the bill payment portal. In the same or other embodiments, biller system 370 can send the confirmation number in a confirmation message to biller financial institution 360. Payment-messaging system 350 can pass the payment status change message to consumer financial institution 340, which can then send the confirmation message and/or confirmation number to consumer device 320 to display to consumer 310. In several embodiments, the payment can be completed in real-time from the time that consumer 310 submitted payment in activity 606 until payment is posted in activity 614. In many embodiments, sending of actual funds from consumer financial institution 340 to biller financial institution 360 can occur later through settlement network 390, such as through daily and/or nightly batch ACH settlement. In other embodiments, real-time settlement can occur.

The method of FIG. 6 involves a biller liability model, in which the biller determines whether to assume liability for the payment. An advantage of this approach is reduced customer friction in the 'make payment' process, as consumer financial institution 340 does not reach out to consumer 310 to verification that the consumer is actually requesting the payment. A disadvantage for biller 380 is risk and financial liability for unauthorized payments. Billers can mitigate this risk by using the risk metric when determining whether to accept and when initiating an AFP. In some embodiments biller financial institution 360 can assume liability for the payment. In other embodiments a third-party service provider (e.g., a BSP providing biller system 370) can assume the liability. In several embodiments, biller 380 and biller financial institution 360 can both assume the liability (e.g., 50/50 or 75/25, etc.). In many embodiments, biller 380 and the third-party service provider can both assume the liability (e.g., 50/50 or 75/25, etc.). In at least one embodiment, biller 380, biller financial institution 360, and the third-party service provider (e.g., a BSP providing biller system 370) can all assume the liability (e.g., 33/33/33 or 10/30/60, etc.).

Another method involves a bank authentication model, in which consumer financial institution 340 assumes liability for the payment. In this model, the consumer financial institution 340 authenticates consumer 310. This model introduces more friction in the 'make payment' process than the biller liability model shown in FIG. 6. In some embodiments, consumer financial institution 340 assumes the liability unless biller 380 (or biller financial institution 360, or third-party service provider (e.g., a BSP providing biller system 370)) affirmatively opts to assume the liability. In many embodiments, consumer financial institution 340 can authorize consumer 310 using conventional mobile app authentication methods, such as passcode, push notification, biometrics, etc. In several embodiments, there can be two separate authentications: (1) an initial authentication of consumer 310, and (2) an authentication of each transaction involving consumer 310. In some embodiments, the assumed liability can be a risk of fraud. In other embodiments, the assumed liability can be a risk of credit loss. In at least one embodiment, the assumed liability can be a risk of both fraud and credit loss. In some embodiments, the bank authentication model can be used, but based on precedence, such as previous successful transactions, the friction can be removed.

In some embodiments, the biller liability and bank authentication models can be combined, such that both consumer financial institution 340 and biller 380 (or biller financial institution 360 or third-party service provider (e.g., a BSP providing biller system 370)) share the assumed liability (e.g., 50/50 or 25/75, etc.). In some embodiments the liability sharing, such as acceptance of partial liability, can be on a transaction-by-transaction basis. For example, the parties can opt to accept or decline liability for certain transaction types and/or transaction amounts. In other embodiments, for certain types of transactions, one of the parties alone can assume the liability for that transaction. In some embodiments, the parties can share liability on a single transaction.

Figure 7:
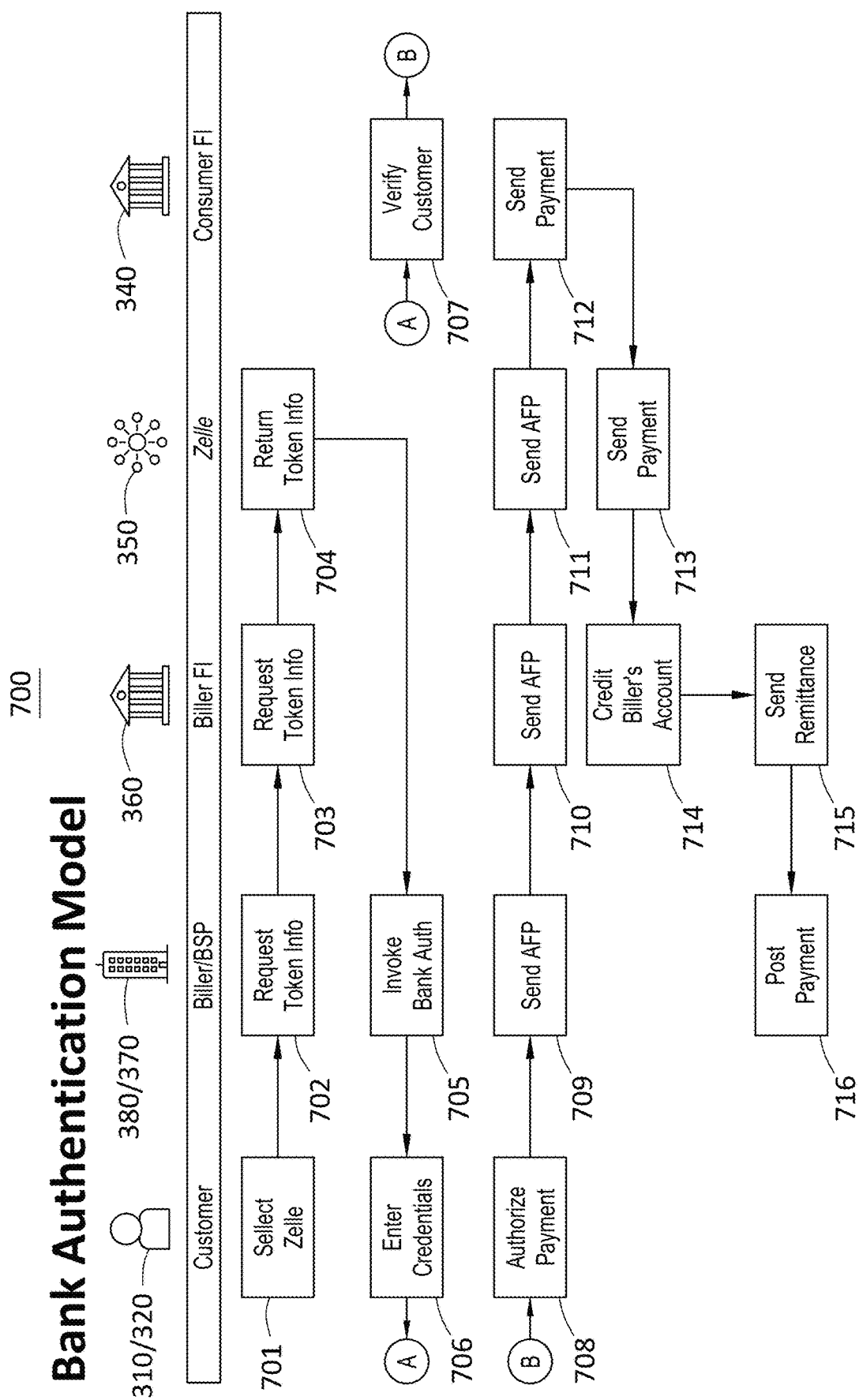
FIG. 7 illustrates a flow chart for a method of facilitating direct electronic bill payment with real-time funds availability in a bank authentication model, according to an embodiment.

Turning ahead in the drawings, FIG. 7 illustrates a flow chart for a method 700 of facilitating direct electronic bill payment with real-time funds availability in a bank authentication model, according to an embodiment. Method 700 is merely exemplary and is not limited to the embodiments presented herein. Method 700 can be employed in many different embodiments or examples not specifically depicted or described herein. In some embodiments, the procedures, the processes, and/or the activities of method 700 can be performed in the order presented. In other embodiments, the procedures, the processes, and/or the activities of method 700 can be performed in any suitable order. In still other embodiments, one or more of the procedures, the processes, and/or the activities of method 700 can be combined or skipped. Method 700 can be similar to method 600 (FIG. 6), and various activities of method 700 can be similar or identical to various activities of method 600 (FIG. 6).

In many embodiments, system 300 (FIG. 3) can be suitable to perform method 700 and/or one or more of the activities of method 700, such as activities 701-716. In these or other embodiments, one or more of the activities of method 700 can be implemented as one or more computing instructions configured to run at one or more processors and configured to be stored at one or more non-transitory computer readable media. Such non-transitory computer readable media can be part of system 300. The processor(s) can be similar or identical to the processor(s) described above with respect to computer system 100 (FIG. 1). In some embodiments, method 700 and other activities in method 700 can include using a distributed network including distributed memory architecture to perform the associated activity. This distributed architecture can reduce the impact on the network and system resources to reduce congestion in bottlenecks while still allowing data to be accessible from a central location.

Referring to FIG. 7, method 700 can begin with an activity 701 of consumer 310 using consumer device 320 to select, on a bill payment portal provided by biller system 370, a payment method of using payment-messaging system 350 (e.g., Zelle), such as shown in FIGS. 4 and/or 5, and described above. Activity 701 can be similar or identical to activity 601 (FIG. 6). As described above, part of consumer 310 select this payment method can involve consumer 310 providing the public identifier that consumer 310 has previously registered with payment-messaging system 350. The public identifier (sender token) can be sent from consumer device 320 to biller system 370.

Next, at activity 702, biller system 370 can request additional information about the sender token by sending a request to biller financial institution 360. Activity 702 can be similar or identical to activity 602 (FIG. 6). At activity 703, biller financial institution 360 can send the request to payment-messaging system 350. Activity 703 can be similar or identical to activity 603 (FIG. 6).

Next, at activity 704, payment-messaging system 350 can determine whether the sender token can be used to authorize a payment by validating the sender token, and returning this information (e.g., whether the token can be used and/or the risk metric) to biller system 370, which in many embodiments can be returned through biller financial institution 360. Activity 704 can be similar or identical to activity 604 (FIG. 6).

Next, at activity 705, biller 380 and/or biller system 370 can invoke a bank authentication from consumer financial institution 340. In some embodiments, the bank authentication can be invoked when consumer financial institution 340 is responsible for assuming liability. In other embodiments, bank authentication can be invoked at activity 705 when biller 380 and/or biller system 370 decide to not accept liability, such as at activity 605 (FIG. 6), such as because the risk status is Red, and/or the risk score is too low. In effect, such a determination by biller 380 and/or biller system 370 to not assume liability can cause the biller liability model of method 600 (FIG. 6) to because the bank authentication model of method 700 of FIG. 7. By invoking bank authentication, biller 380 and/or biller system 370 indicates to consumer 310 and/or consumer financial institution 340 that it is not assuming responsibility for the payment.

In many embodiments, biller system 370 can send information to consumer device 320 to be displayed to consumer 310 regarding the bank authentication, such as displaying information about how consumer financial institution 340 will authenticate consumer 310 before the payment can be processed. In some embodiments, biller system 370 can redirect to consumer financial institution 340 to initiate authentication of consumer 310. In some embodiments, consumer financial institution 340 can request information from consumer 310, or can authenticate consumer 310, through a push app notification, text (e.g., SMS) message, email message, or other message to consumer 310. In many embodiments, consumer 310 enter a one-time passcode or other credentials using consumer device 320. In some embodiments, the bank authentication done by consumer financial institution 340 can be done outside the bill payment portal provided by biller system 370. In other embodiments, the bank authentication done by consumer financial institution 340 can be performed inside the bill payment portal provided by biller system 370 or through a redirection to consumer financial institution 340 handled within the bill payment portal.

In yet other embodiments, biller system 370 can invoke the bank authentication by calling an identity verification service, such as OpenID Connect (OIDC), XID, OAuth, etc. In some embodiments, the identity verification service can be provided by payment-messaging system 350. In other embodiments, the identity verification service can be provided by a third-party. For example, when the identity verification service is provided by payment-messaging system 350, biller system 370 can redirect to payment-messaging system 350, such as through the XID URL (uniform resource locator). In many embodiments, payment-messaging system 350 can redirect to the OIDC URL, which can allow consumer 310 to login to consumer financial institution 340, perform any step-up authentication specified by consumer financial institution 340, show payment details to consumer 310, and ask for payment authorization and/or approval. After approved, consumer financial institution 340 can return an authorization code to payment-messaging system 350, which can then return the authorization code to biller system 370. In some embodiments, biller 380 can request an access token from consumer financial institution 340, such as by communicating with consumer financial institution 340 through payment-messaging system 350 using XID, and can receive this access token if approved by consumer financial institution 340. In such embodiments using an identity verification service, flow of method 700 can proceed to activity 709, described below.

When not using an identity verification service, consumer 310 can enter credentials for the bank authentication at activity 706, such as consumer login information for consumer financial institution 340, one-time passcode, or other authorization. This credential information can be sent to consumer financial institution 340 from consumer device 320 and/or biller system 370. At activity 707, consumer financial institution 340 can verify the credentials of consumer 310 to complete the bank authentication.

After consumer financial institution 340 has completed the bank authentication, biller system 370 can display the submit payment button to consumer 310 on the bill payment portal, which can allow consumer to authorize the payment. At activity 708, consumer 310 can authorize the payment by selecting the payment button. In yet other embodiments, biller system 370 can enable the button to allow consumer 310 to submit payment before the bank authentication is complete, but can include information or instructions that consumer financial institution 340 will do a bank authentication after consumer 310 selects the button to authorize the payment. Activity 708 can be similar to activity 606 (FIG. 6).

Next, at activity 709, biller system can generate and send an AFP message to biller financial institution 360. Activity 709 can be similar to activity 607 (FIG. 6). In many embodiments, the AFP message can include a flag or other indicator that biller 380 is not accepting liability of the payment, and if the bank authentication is already complete, can refer to the verification performed by consumer financial institution 340, such as by including an authorization code and/or access token provided by consumer financial institution 340.

Next, at activity 710, the AFP message can be sent from biller financial institution 360 to payment-messaging system 350. Activity 710 can be similar or identical to activity 608 (FIG. 6). In some embodiments, payment-messaging system 350 can determine whether the requestor (biller 380, biller system 370, and/or biller financial institution 360) sending the AFP message is registered and authorized to send the AFP message using the direct electronic bill payment with real-time funds availability techniques described herein. If so, next, at activity 711, payment-messaging system 350 can send the AFP message to consumer financial institution 340. Activity 711 can be similar or identical to activity 609 (FIG. 6).

Upon consumer financial institution 340 receiving the AFP message, consumer financial institution 340 can determine if the payment request has already been authorized by consumer financial institution 340 (e.g., by consumer financial institution 340 checking the authorization code or access token included in the AFP), or instead if bank authentication has yet to be performed. If bank authentication has not yet been performed, consumer financial institution 340 can perform bank authentication, such as by sending a message (e.g., a call-to-action (CTA) notification, such as a push app notification, text (SMS) message, email message, or other suitable message) to consumer 310 to authenticate consumer 310 and/or obtain authorization from consumer 310.

After consumer financial institution 340 determines that bank authorization was successfully completed, consumer financial institution 340 can debit consumer account 343 (FIG. 3) (e.g., pull funds using a memo post) and can send a payment message to payment-messaging system 350 at activity 712. Activity 712 can be similar to activity 610 (FIG. 6). At activity 713, payment-messaging system 350 can send the payment message to biller financial institution 360. Activity 713 can be similar or identical to activity 611 (FIG. 6). At activity 714, biller financial institution 360 can credit biller account 363 (FIG. 3) with the funds. Activity 714 can be similar or identical to activity 612 (FIG. 6). At activity 715, biller financial institution 360 can send a remittance message to biller system 370. Activity 715 can be similar or identical to activity 613 (FIG. 6). At activity 716, upon receipt of the remittance message, biller system 370 can generate a confirmation number and post the payment to consumer billing account 373 (FIG. 3). Activity 716 can be similar or identical to activity 614 (FIG. 6). In many embodiments, the confirmation number can be sent from biller system 370 to consumer device 320 to show to consumer 310 while consumer 310 through the bill payment portal. In the same or other embodiments, biller system 370 can send the confirmation number in a confirmation message to biller financial institution 360. After receiving the confirmation message, biller financial institution 360 can send a change payment status message to payment-messaging system 350, indicating that the payment has been credited to biller account 363 (FIG. 3). Payment-messaging system 350 can pass the payment status change message to consumer financial institution 340, which can then send the confirmation message and/or confirmation number to consumer device 320 to display to consumer 310. In several embodiments, the payment can be completed in real-time from the time consumer 310 submitted payment in activity 706 until payment is posted in activity 714. In many embodiments, sending of actual funds from consumer financial institution 340 to biller financial institution 360 can occur later through settlement network 390, such as through daily and/or nightly batch ACH settlement. In other embodiments, real-time settlement can occur.

Figure 8:
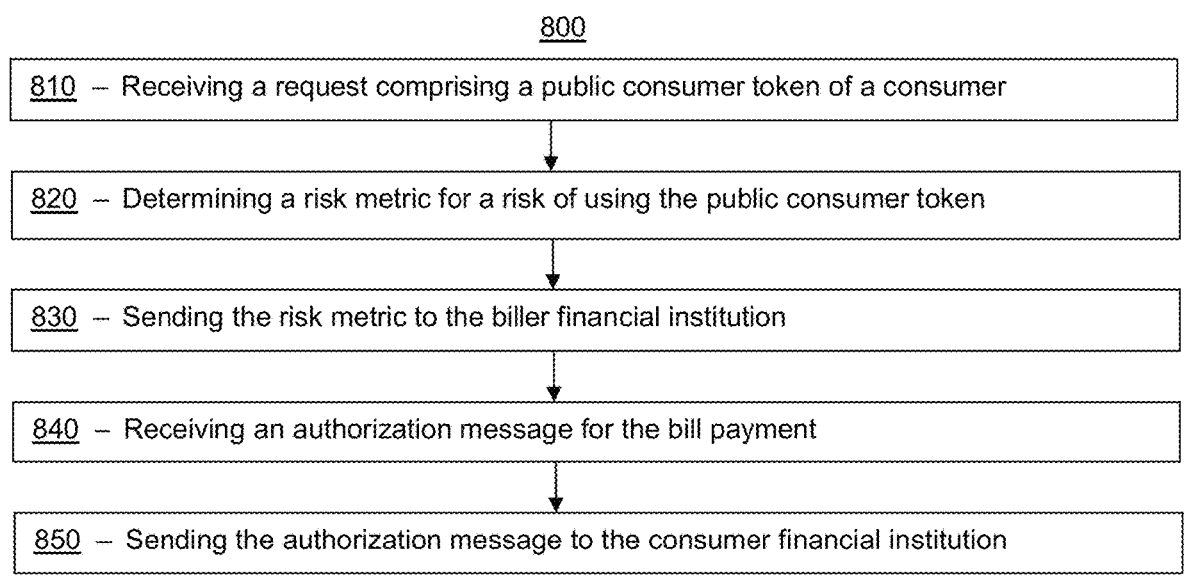
FIG. 8 illustrates a flow chart for a method of facilitating direct electronic bill payment with real-time funds availability, according to an embodiment.

Turning ahead in the drawings, FIG. 8 illustrates a flow chart for a method 800 of facilitating direct electronic bill payment with real-time funds availability, according to an embodiment. Method 800 is merely exemplary and is not limited to the embodiments presented herein. Method 800 can be employed in many different embodiments or examples not specifically depicted or described herein. In some embodiments, the procedures, the processes, and/or the activities of method 800 can be performed in the order presented. In other embodiments, the procedures, the processes, and/or the activities of method 800 can be performed in any suitable order. In still other embodiments, one or more of the procedures, the processes, and/or the activities of method 800 can be combined or skipped. Method 800 can be similar or identical to method 600 (FIG. 6) and/or method 700 (FIG. 7). Various activities of method 800 can be similar or identical to various activities of method 600 (FIG. 6) and/or method 700 (FIG. 7).

In many embodiments, system 300 (FIG. 3) and/or payment-messaging system 350 (FIG. 3) can be suitable to perform method 800 and/or one or more of the activities of method 800. In these or other embodiments, one or more of the activities of method 800 can be implemented as one or more computing instructions configured to run at one or more processors and configured to be stored at one or more non-transitory computer readable media. Such non-transitory computer readable media can be part of system 300. The processor(s) can be similar or identical to the processor(s) described above with respect to computer system 100 (FIG. 1). In some embodiments, method 800 and other activities in method 800 can include using a distributed network including distributed memory architecture to perform the associated activity. This distributed architecture can reduce the impact on the network and system resources to reduce congestion in bottlenecks while still allowing data to be accessible from a central location.

Referring to FIG. 8, method 800 can include an activity 810 of receiving, at a payment-messaging system from a biller financial institution, a request comprising a public consumer token of a consumer. The biller financial institution can be similar or identical to biller financial institution 360 (FIG. 3). The consumer can be similar or identical to consumer 310 (FIG. 3) and/or consumer device 320 (FIG. 3). The request can be similar or identical to the request sent from biller financial institution 360 (FIG. 3) to payment-messaging system 350 in activities 603 (FIG. 6) and/or 703 (FIG. 7). The payment-messaging system can be similar or identical to payment-messaging system 350 (FIG. 3). The public consumer token can be similar or identical to the public identifier and/or sender token described above. In some embodiments, the public consumer token can be a phone number, a Zelle tag, or email address of the consumer.

In a number of embodiments, the consumer provided the public consumer token to a biller system of a biller for a bill payment by the consumer to the biller, similar or identical to activities 601 (FIG. 6) or 701 (FIG. 7). The biller system can be similar or identical to biller system 370 (FIG. 3). The biller can be similar or identical to biller 380 (FIG. 3). In several embodiments, the biller system provided the public consumer token to the biller financial institution, similar or identical to activities 602 (FIG. 6) or 702 (FIG. 7). In a number of embodiments, the biller financial institution maintains a biller account of the biller. The biller account can be similar or identical to biller account 363 (FIG. 3). In some embodiments, the consumer requested the bill payment without providing the biller with account information of a consumer account of the consumer maintained at a consumer financial institution. The consumer account can be similar or identical to consumer account 343 (FIG. 3). The consumer financial institution can be similar or identical to consumer financial institution 340 (FIG. 3).

In a number of embodiments, method 800 also can include an activity 820 of determining a risk metric representing a risk of using the public consumer token for the bill payment. In several embodiments, the risk metric can be calculated based in part on information about the consumer received from the biller, information about the consumer received from the MNO associated with the phone number of the biller, information about the consumer received about the email address associated with the consumer, information about a mobile device used by the consumer, and/or other suitable information.

In several embodiments, method 800 additionally can include an activity 830 of sending the risk metric from the payment-messaging system to the biller financial institution. In some embodiments, the biller financial institution can send the risk metric to the biller system to allow the biller to determine whether to assume liability for the bill payment. Activities 820 and/or 830 can be similar or identical to activities 604 (FIG. 6) and/or 704 (FIG. 7).

In a number of embodiments, method 800 further can include an activity 840 of receiving, at the payment-messaging system from the biller financial institution, an authorization message for the bill payment. The authorization message can be similar or identical to the AFP message sent from biller financial institution 360 to payment-messaging system 350 in activities 608 (FIG. 6) and/or 710 (FIG. 7). In a number of embodiments, the authorization message was provided to the biller financial institution by the biller system, similar or identical to activities 607 (FIG. 6) and/or 709 (FIG. 7).

In some embodiments, the authorization message was provided by the biller system after the biller assumed liability for the bill payment, similar or identical to activity 605 (FIG. 6) in the biller liability model of method 600 (FIG. 6). In some such embodiments, the biller assumed liability for the bill payment based on the risk metric provided by the payment-messaging system, and/or the biller assumed liability for the bill payment after performing a step-up authentication of the consumer.

In other embodiments, the authorization message was provided by the biller system after the consumer financial institution assumed liability for the bill payment, similar or identical to activities 705-707 (FIG. 7) in the bank authentication model of method 700 (FIG. 7). In some such cases, the biller did not assume liability for the payment, and/or the consumer financial institution assumed liability for the bill payment after performing an authentication of the consumer.

In several embodiments, method 800 additionally can include an activity 850 of sending the authorization message for the bill payment to a consumer financial institution, to cause the consumer financial institution to send a real-time payment message through the payment-messaging system to the biller financial institution to make funds available in real-time in the biller account for the bill payment. Activity 850 can be similar or identical to activities 609 (FIG. 6) and/or 711 (FIG. 7). The real-time payment message can be similar or identical to the message sent in activities 609-610 (FIG. 6) and/or 712-13 (FIG. 7). The making of funds available in real-time in the biller account can be similar or identical to activities 612-614 (FIG. 6) and/or 714-716 (FIG. 7).

In some embodiments, the real-time payment message includes an irrevocable promise to pay a payment amount for the bill payment from the consumer account of the consumer maintained at the consumer financial institution to the biller account. In various embodiments, settlement of the bill payment between the consumer financial institution and the biller financial institution can occur in a batch ACH or other suitable later settlement methods after the funds are made available in real-time in the biller account, or can be settled in real-time through TCH (The Clearing House) RTP (Real-Time Payments) for the FedNow service offered by the federal reserve banks or other suitable real-time settlement rails.

Returning to FIG. 3, in several embodiments, communication system 351 can at least partially perform activities 603-604 and/or 608-611 (FIG. 6), activities 703-704 and/or 710-713 (FIG. 7), and/or activities 810, 830, 840, and/or 850 (FIG. 8).

In several embodiments, risk engine 352 can at least partially perform activity 604 (FIG. 6), activity 704 (FIG. 7), and/or activity 820 (FIG. 8).

In many embodiments, the techniques described herein can provide a practical application and several technological improvements. In some embodiments, the techniques described herein can provide for direct electronic bill payment with real-time funds availability. These techniques described herein can provide a significant improvement over conventional approaches of in which consumers (e.g., 310) provide sensitive PII (personally identifiable information), such as debit or credit card numbers, bank account numbers, etc., to the biller for bill payment. Instead, a consumer can provide a public identifier, such as an email address or phone number to the biller to make secure bill payments.

In several embodiments, the techniques described herein can beneficially cause the funds to be automatically debited from the customer account (e.g., 343) and made available in real-time to the biller account (e.g., 363). These techniques can extend the credit push model within the context of the bill payment portal by adding a debit pull model that leverages an existing payment request function. In several embodiments, the payment request in the credit push process from the consumer financial institution (e.g., 340) to the biller financial institution (e.g., 360) can be concealed, such that after the consumer initiates a payment request from the biller's bill payment portal, the request, in many cases, is not subsequently presented to the consumer for authorization from the consumer financial institution.

In a number of embodiments, techniques described herein can advantageously use risk-based token authorization, such that consumer interaction can be minimized by not asking the consumer to authenticate after the consumer has entered the initiated the payment request. In several embodiments, the risk determination can use contextual information gathered about the consumer. In a number of embodiments, a graded/tiered authentication can be used depending on the risk level.

In many embodiments, the techniques described herein can be used continuously at a scale that cannot be handled using manual techniques. For example, the techniques can be applied to millions of transactions daily.

In a number of embodiments, personally identifiable information of consumers (e.g., consumer 310 (FIG. 3)) can be protected by not including such information in messages exchanged between the financial institutions (e.g., consumer financial institution 340, biller financial institution 360 (FIG. 3)), the payment-messaging system (e.g., 350 (FIG. 3), and/or the settlement network (e.g., settlement network 390 (FIG. 3)), which can reduce the risk of fraud if messages are intercepted or otherwise compromised.

In many embodiments, the techniques described herein can beneficially eliminate insufficient funds (NSF) messages and resulting chargebacks to the billers that exist in many conventional bill payment approaches, as the consumer financial institution (e.g., 340) will not send the payment message to the biller financial institution (e.g., 360) unless the consumer account (e.g., 343) has sufficient funds.

In a number of embodiments, the techniques described herein can solve a technical problem that arises only within the realm of computer networks, as online payment does not exist outside the realm of computer networks. Moreover, the techniques described herein can solve a technical problem that cannot be solved outside the context of computer networks. Specifically, the techniques described herein cannot be used outside the context of computer networks, in view of a lack of ability to securely send payment messages in real-time.

Various embodiments can include a system including one or more processors and one or more non-transitory computer-readable media storing computing instructions that, when executed on the one or more processors, perform certain acts. The acts can include receiving, at a payment-messaging system from a biller financial institution, a request comprising a public consumer token of a consumer. The consumer provided the public consumer token to a biller system of a biller for a bill payment by the consumer to the biller. The biller system provided the public consumer token to the biller financial institution. The biller financial institution maintains a biller account of the biller. The acts also can include determining a risk metric representing a risk of using the public consumer token for the bill payment. The acts additionally can include sending the risk metric from the payment-messaging system to the biller financial institution. The biller financial institution sends the risk metric to the biller system to allow the biller to determine whether to assume liability for the bill payment. The acts further can include receiving, at the payment-messaging system from the biller financial institution, an authorization message for the bill payment. The authorization message was provided to the biller financial institution by the biller system. The acts additionally can include sending the authorization message for the bill payment to a consumer financial institution, to cause the consumer financial institution to send a real-time payment message through the payment-messaging system to the biller financial institution to make funds available in real-time in the biller account for the bill payment.

A number of embodiments can include a method being implemented via execution of computing instructions configured to run at one or more processors. The method can include receiving, at a payment-messaging system from a biller financial institution, a request comprising a public consumer token of a consumer. The consumer provided the public consumer token to a biller system of a biller for a bill payment by the consumer to the biller. The biller system provided the public consumer token to the biller financial institution. The biller financial institution maintains a biller account of the biller. The method also can include determining a risk metric representing a risk of using the public consumer token for the bill payment. The method additionally can include sending the risk metric from the payment-messaging system to the biller financial institution. The biller financial institution sends the risk metric to the biller system to allow the biller to determine whether to assume liability for the bill payment. The method further can include receiving, at the payment-messaging system from the biller financial institution, an authorization message for the bill payment. The authorization message was provided to the biller financial institution by the biller system. The method additionally can include sending the authorization message for the bill payment to a consumer financial institution, to cause the consumer financial institution to send a real-time payment message through the payment-messaging system to the biller financial institution to make funds available in real-time in the biller account for the bill payment.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although direct electronic bill payment with real-time funds availability has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIGS. 6-8 may include different procedures, processes, and/or activities and be performed by many different modules, in many different orders, and/or one or more of the procedures, processes, or activities of FIGS. 6-8 may include one or more of the procedures, processes, or activities of another different one of FIGS. 6-8. As another example, the systems or component systems thereof within system 300 in FIG. 3 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A payment-messaging computing system comprising:
   one or more processors; and
   one or more non-transitory computer-readable media storing computing instructions that, when executed on the one or more processors, cause the one or more processors to perform:
      receiving, at the payment-messaging computing system from a biller financial institution, a request for information about a public consumer token of a consumer, wherein the request for information comprises the public consumer token of the consumer, wherein the public consumer token is one of a phone number, a Zelle tag, or an email address of the consumer, wherein the request for information is received at the payment-messaging computing system after the consumer provided the public consumer token to a biller computer of a biller for a bill payment by the consumer to the biller and the biller computer provided the public consumer token to the biller financial institution, and wherein the biller financial institution maintains a biller account of the biller;
      determining that the public consumer token of the consumer is registered and active in a directory of the payment-messaging computing system, comprising:
         determining if the public consumer token is included in the directory;
         determining how long the public consumer token has been registered; and
         determining whether the public consumer token is a known bad token; and
      determining a risk metric representing a risk of using the public consumer token for the bill payment, comprising:
         obtaining consumer information comprising first consumer information received from the biller, second consumer information received from a mobile network operator associated with a mobile phone of the consumer, third consumer information received from a third-party email identity verification service, geolocation information for the mobile phone of the consumer, and browser information for the mobile phone of the consumer, wherein the first consumer information received from the biller comprises biller account duration information for the consumer, wherein the second consumer information received from the mobile network operator comprises SIM (subscriber identity module) card swap event information, SIM operator name information, and phone number change event information, and wherein the third consumer information received from the third-party email identity verification service comprises first name and last name of a user associated with the email address;
         performing name matching, address matching, and email address matching by comparing the first consumer information received from the biller against the second consumer information received from the mobile network operator and the third consumer information received from the third-party email identity verification service; and
         performing contextual analysis based on contextual information about a customer relationship between the consumer and the biller, location contextual information about the consumer, device contextual information, and network contextual information, wherein the directory provides a centralized repository for mapping tokenized identifiers to consumer account information for a plurality of consumers at a network of a plurality of financial institutions registered with payment-messaging computing system, and wherein the public consumer token of the consumer was added to the directory upon the consumer registering for the payment-messaging computing system through a consumer financial institution;
      sending the risk metric from the payment-messaging computing system to the biller financial institution to cause the biller financial institution to send the risk metric to the biller computer to allow the biller to determine whether to assume liability for the bill payment or instead request the consumer financial institution assume liability and whether to perform a step-up authentication, based on the risk metric;
      receiving, at the payment-messaging computing system from the biller financial institution, an authorization message for the bill payment after the authorization message was provided to the biller financial institution by the biller computer; and
      sending the authorization message for the bill payment to the consumer financial institution, to cause the consumer financial institution to send a real-time payment message through the payment-messaging computing system to the biller financial institution to make funds available in real-time in the biller account for the bill payment.

2. The payment-messaging computing system of claim 1, wherein the real-time payment message comprises an irrevocable promise to pay a payment amount for the bill payment from a consumer account of the consumer maintained at the consumer financial institution to the biller account.

3. The payment-messaging computing system of claim 1, wherein:
the consumer requested the bill payment without providing the biller with account information of a consumer account of the consumer maintained at the consumer financial institution.

4. The payment-messaging computing system of claim 1, wherein settlement of the bill payment between the consumer financial institution and the biller financial institution occurs in a batch ACH after the funds are made available in real-time in the biller account.

5. The payment-messaging computing system of claim 1, wherein the authorization message was provided by the biller computer after the biller assumed liability for the bill payment.

6. The payment-messaging computing system of claim 5, wherein the biller assumed liability for the bill payment based on the risk metric provided by the payment-messaging computing system.

7. The payment-messaging computing system of claim 5, wherein the biller assumed liability for the bill payment after performing the step-up authentication of the consumer.

8. The payment-messaging computing system of claim 1, wherein the authorization message was provided by the biller computer after the consumer financial institution assumed liability for the bill payment.

9. The payment-messaging computing system of claim 8, wherein:
the biller did not assume liability for the bill payment; and
the consumer financial institution assumed liability for the bill payment after performing an authentication of the consumer.

10. The payment-messaging computing system of claim 1, wherein the first consumer information received from the biller further comprises profile change event history for the consumer.

11. A method being implemented via execution of computing instructions configured to run at one or more processors of a payment-messaging computing system, the method comprising:
receiving, at the payment-messaging computing system from a biller financial institution, a request for information about a public consumer token of a consumer, wherein the request for information comprises the public consumer token of the consumer, wherein the public consumer token is one of a phone number, a Zelle tag, or an email address of the consumer, wherein the request for information is received at the payment-messaging computing system after the consumer provided the public consumer token to a biller computer of a biller for a bill payment by the consumer to the biller and the biller computer provided the public consumer token to the biller financial institution, and wherein the biller financial institution maintains a biller account of the biller;
determining that the public consumer token of the consumer is registered and active in a directory of the payment-messaging computing system, comprising:
determining if the public consumer token is included in the directory;
determining how long the public consumer token has been registered; and
determining whether the public consumer token is a known bad token; and
determining a risk metric representing a risk of using the public consumer token for the bill payment, comprising:
obtaining consumer information comprising first consumer information received from the biller, second consumer information received from a mobile network operator associated with a mobile phone of the consumer, third consumer information received from a third-party email identity verification service, geolocation information for the mobile phone of the consumer, and browser information for the mobile phone of the consumer, wherein the first consumer information received from the biller comprises biller account duration information for the consumer, wherein the second consumer information received from the mobile network operator comprises SIM (subscriber identity module) card swap event information, SIM operator name information, and phone number change event information, and wherein the third consumer information received from the third-party email identity verification service comprises first name and last name of a user associated with the email address;
performing name matching, address matching, and email address matching by comparing the first consumer information received from the biller against the second consumer information received from the mobile network operator and the third consumer information received from the third-party email identity verification service; and
performing contextual analysis based on contextual information about a customer relationship between the consumer and the biller, location contextual information about the consumer, device contextual information, and network contextual information, wherein the directory provides a centralized repository for mapping tokenized identifiers to consumer account information for a plurality of consumers at a network of a plurality of financial institutions registered with payment-messaging computing system, and wherein the public consumer token of the consumer was added to the directory upon the consumer registering for the payment-messaging computing system through a consumer financial institution;
sending the risk metric from the payment-messaging computing system to the biller financial institution to cause the biller financial institution to send the risk metric to the biller computer to allow the biller to determine whether to assume liability for the bill payment or instead request the consumer financial institution assume liability and whether to perform a step-up authentication, based on the risk metric;
receiving, at the payment-messaging computing system from the biller financial institution, an authorization message for the bill payment after the authorization message was provided to the biller financial institution by the biller computer; and
sending the authorization message for the bill payment to the consumer financial institution, to cause the consumer financial institution to send a real-time payment message through the payment-messaging computing system to the biller financial institution to make funds available in real-time in the biller account for the bill payment.

12. The method of claim 11, wherein the real-time payment message comprises an irrevocable promise to pay a payment amount for the bill payment from a consumer account of the consumer maintained at the consumer financial institution to the biller account.

13. The method of claim 11, wherein:
the consumer requested the bill payment without providing the biller with account information of a consumer account of the consumer maintained at the consumer financial institution.

14. The method of claim 11, wherein settlement of the bill payment between the consumer financial institution and the biller financial institution occurs in a batch ACH after the funds are made available in real-time in the biller account.

15. The method of claim 11, wherein the authorization message was provided by the biller computer after the biller assumed liability for the bill payment.

16. The method of claim 15, wherein the biller assumed liability for the bill payment based on the risk metric provided by the payment-messaging computing system.

17. The method of claim 15, wherein the biller assumed liability for the bill payment after performing the step-up authentication of the consumer.

18. The method of claim 11, wherein the authorization message was provided by the biller computer after the consumer financial institution assumed liability for the bill payment.

19. The method of claim 18, wherein:
the biller did not assume liability for the bill payment; and
the consumer financial institution assumed liability for the bill payment after performing an authentication of the consumer.

20. The method of claim 11, wherein the first consumer information received from the biller further comprises profile change event history for the consumer.

* * * * *